US012741903B2

(12) United States Patent
Mueller et al.

(10) Patent No.: US 12,741,903 B2
(45) Date of Patent: Sep. 22, 2026

(54) COVER GLASS WITH AN ANOMALOUS STRESS PROFILE, PROCESS FOR PRODUCTION THEREOF AND USE THEREOF

(71) Applicants: SCHOTT AG, Mainz (DE); SCHOTT Technical Glass Solutions GmbH, Jena (DE)

(72) Inventors: Lars Mueller, Wiesbaden (DE); Ruediger Dietrich, Jena (DE); Thomas Pfeiffer, Ingelheim (DE); Julian Koch, Mainz (DE); Bernd Ruedinger, Woerrstadt (DE); Meike Schneider, Taunusstein (DE); Jochen Alkemper, Klein-Winternheim (DE)

(73) Assignees: SCHOTT AG, Mainz (DE); SCHOTT TECHNICAL GLASS SOLUTIONS GMBH, Jena (DE)

( * ) Notice: Subject to any disclaimer, the term of this patent is extended or adjusted under 35 U.S.C. 154(b) by 538 days.

(21) Appl. No.: 18/064,744

(22) Filed: Dec. 12, 2022

(65) Prior Publication Data

US 2023/0183127 A1 Jun. 15, 2023

(30) Foreign Application Priority Data

Dec. 10, 2021 (DE) ..................... 10 2021 132 738.5
Jun. 3, 2022 (DE) ..................... 10 2022 114 184.5

(51) Int. Cl.
*C03C 10/00* (2006.01)
*C03B 32/02* (2006.01)
(Continued)

(52) U.S. Cl.
CPC .......... *C03C 10/0027* (2013.01); *C03B 32/02* (2013.01); *C03C 3/083* (2013.01);
(Continued)

(58) Field of Classification Search
None
See application file for complete search history.

(56) References Cited

U.S. PATENT DOCUMENTS 6,673,729 B2 1/2004 Siebers
9,249,045 B2 2/2016 Gabel
(Continued)

FOREIGN PATENT DOCUMENTS

CN 110872175 A * 3/2020
CN 112441746 3/2021
(Continued)

OTHER PUBLICATIONS

Duebner et al., "Nomenclature of functional crystals in glass-ceramics: A recommendation based on aluminosilicate solid solutions," Journal of Non-Crystalline Solids 633 (2024) 122954 (Year: 2024).*

(Continued)

*Primary Examiner* — David Sample
(74) *Attorney, Agent, or Firm* — Ruggiero McAllister & McMahon LLC

(57) ABSTRACT

A cover glass made of a glass ceramic that is silica based and has a main crystal phase of high quartz solid solution or keatite solid solution is provided. The cover glass has a stress profile with at least one inflection point at a depth of the cover glass of more than 10 μm, a thickness from 0.1 mm to 2 mm, and a chemical tempering structure with a surface compressive stress of at least 250 MPa and at most 1500 MPa. A process for producing the cover glass is provided that includes producing a silica based green glass, hot shaping the silica based green glass, thermally treating the silica based green glass with a nucleation step and a ceramization step, and performing an ion exchange at an exchange bath temperature for a duration of time in an exchange bath.

21 Claims, 9 Drawing Sheets

(51) Int. Cl.

| | |
|---|---|
| ***C03C 3/083*** | (2006.01) |
| ***C03C 3/085*** | (2006.01) |
| ***C03C 3/087*** | (2006.01) |
| ***C03C 21/00*** | (2006.01) |

(52) U.S. Cl.

CPC .............. *C03C 3/085* (2013.01); *C03C 3/087* (2013.01); *C03C 10/0009* (2013.01); *C03C 10/0054* (2013.01); *C03C 21/002* (2013.01); *C03C 2201/50* (2013.01); *C03C 2203/20* (2013.01); *C03C 2203/50* (2013.01); *C03C 2204/00* (2013.01)

(56) References Cited

U.S. PATENT DOCUMENTS

| | | | | |
|---|---|---|---|---|
| 12,122,703 | B2* | 10/2024 | Guo | C03C 10/0027 |
| 2007/0259767 | A1 | 11/2007 | Siebers | |
| 2010/0009154 | A1 | 1/2010 | Allan | |
| 2014/0134397 | A1* | 5/2014 | Amin | C03C 10/0045 428/141 |
| 2015/0099124 | A1* | 4/2015 | Beunet | C03C 10/0054 65/30.14 |
| 2016/0102010 | A1 | 4/2016 | Beall | |
| 2017/0183257 | A1 | 6/2017 | Apitz | |
| 2020/0002225 | A1 | 1/2020 | Schneider | |
| 2020/0207660 | A1 | 7/2020 | Li | |
| 2020/0346969 | A1 | 11/2020 | Li | |
| 2021/0269356 | A1* | 9/2021 | Kang | C03C 21/002 |
| 2021/0292225 | A1* | 9/2021 | Umada | C03C 3/087 |
| 2021/0371332 | A1* | 12/2021 | Ichimaru | C03C 3/085 |
| 2022/0281769 | A1* | 9/2022 | Sekiya | C03C 3/083 |
| 2024/0101471 | A1* | 3/2024 | Yuki | C03C 3/085 |

FOREIGN PATENT DOCUMENTS

| | | |
|---|---|---|
| CN | 113754289 | 12/2021 |
| DE | 102006056088 | 5/2008 |
| DE | 102012104168 | 11/2013 |
| EP | 3838858 | 6/2021 |
| EP | 2819966 | 8/2021 |

OTHER PUBLICATIONS

Beall, “Ion-Exchange in Glass-Ceramics”, Frontiers in Materials, vol. 3, Aug. 23, 2016, 11 pages.

DIN ISO 6344-2, “Coated abrasives—Grain size analysis—Part 2: Determination of grain size distribution of macrogrits P12 to P220”, Apr. 2000, English translation, 11 pages.

DIN EN ISO 11664-4, “Colorimetry—Part 4: CIE 1976 L*a*b* Colour space (ISO 11664-4:2008) English translation of DIN EN ISO 11664-4:2012-06”, Jun. 2012, 12 Pages.

* cited by examiner

COVER GLASS WITH AN ANOMALOUS STRESS PROFILE, PROCESS FOR PRODUCTION THEREOF AND USE THEREOF

CROSS-REFERENCE TO RELATED APPLICATIONS

This application claims the benefit of priority under 35 U.S.C. § 119 to German Patent Application No. 102021132 738.5 filed on Dec. 10, 2021, and German Patent Application No. 102022114184.5 filed on Jun. 3, 2022, the entire disclosure of each of which is incorporated by reference herein.

BACKGROUND OF THE DISCLOSURE

1. Field of the Disclosure

The disclosure generally relates to cover glasses, in particular cover glasses for electronic display devices. The disclosure further relates to a process for producing such a cover glass and to the use thereof.

2. Description of Related Art

Cover glasses for electronic display devices, which are also referred to, for example, as covers, have already long been known, serve to cover electronic components beneath and also as a viewing screen, and nowadays are generally constructed in such a way that they comprise a chemically tempered glass pane. The glass pane usually has only a very low thickness of below 1 mm and can also be significantly thinner, since the weight of the display device is equipped with such a cover glass (for example a smartphone or some other portable electronic device) is kept at a minimum in this way. Because the thickness is only very low, the mechanical strength of the glass is reduced, such that, as already stated above, it is necessary to mechanically strengthen the glass by an appropriate treatment. In the case of the thin prior art glasses addressed, this is effected in a chemical tempering process in which the glass pane is immersed into a dip bath comprising a salt melt. In the context of the present disclosure, the dip bath is also referred to synonymously as exchange bath, since ion exchange takes place on immersion into the bath containing the salt melt. In this way, smaller cations present in the glass of the glass pane are exchanged for the larger cations in the dip bath. For example, it is known that sodium ions can be exchanged for potassium ions. The potassium ions, on account of their size, generate a compressive stress in the exchanged near-surface region of the glass pane, which is compensated for by tensile stress within the glass pane. Overall, this increases the durability of the glass pane with respect to mechanical stress.

It is likewise known that glass ceramics can also be amenable to chemical tempering. The above-described exchange mechanism is in principle also applicable to glass ceramics. Glass ceramics in the context of the present disclosure are generally understood to mean materials that are subjected, in the form of a green glass, to a controlled or at least controllable crystallization, so as to result in a microstructure comprising small crystals (or, synonymously, crystallites) having quite a homogeneous size distribution, where the crystals or crystallites do not exceed an average size of preferably 2 μm.

Such glass ceramics can be advantageous by comparison with chemically temperable or chemically tempered glasses because glass ceramics can generally have greater mechanical stability by virtue of their specific microstructure, namely comprising crystallites. In general, however, such glass ceramics cannot be produced in the low thicknesses as is possible for glasses. This means that the use of glass ceramics as material for a cover glass is possibly not particularly advantageous from the point of view of the resulting weight of a portable display device.

In chemically tempered glasses or glass panes, the stress profile obtained by means of ion exchange for a simple ion exchange—i.e. the exchange of a smaller cation, for example of $Na^+$, for a larger cation, such as $K^+$-by way of approximation follows what is called a complementary error function, or the stress curve can be described by way of approximation by such a complementary error function.

However, it has been found that such a progression of the stress profile can be unfavorable. This is because, in such a typical stress profile, there is a significant drop in stress from the surface toward the interior of the glass article. This is critical specifically in the case of action of blunt or smooth surfaces (called "blunt impact stresses"), since there is a flexural stress here that can lead to widening of lateral cracks. A very high compressive stress in the surface beyond a critical depth can be advantageous here in order to counteract this crack widening.

For this purpose, it is advantageous when a maximum compressive stress is established at the surface of the cover glass, such that the steep drop in compressive stress nevertheless leads to a sufficient "DOL" (depth of layer, depth of the compressive stress zone). In the context of the present disclosure, the compressive stress zone is referred to as "DOL" or—more correctly in this respect—as "depth of compression layer", DoCL. But this too can be disadvantageous. This is because, as stated, compressive stress generated in the surface of the cover glass is compensated for by tensile stress in the interior of the cover glass. The higher the compressive stress in the near-surface region of the cover glass, the higher the stored tensile stress in the interior thereof too. Thus, in the case of very high compressive stress in the near-surface region, the adverse effect is that breakage can occur in the case of corresponding stress as a result of the high stored tensile stress, with the occurrence of a large number of small glass splinters. This is unfavorable specifically for a cover glass of a display device, since very many splinters make it far more difficult to see through a pane onto a display beneath than in the case of occurrence of only a few large fragments. This breakage failure should therefore be prevented as far as possible, or should occur only in the case of very high stresses.

There is therefore a need for cover glasses having a sufficiently deep compressive stress zone, such that flexural stress leads to mechanical failure of the cover glass only under very high stresses.

SUMMARY OF THE DISCLOSURE

It is an object of the disclosure to provide cover glasses that at least alleviate the aforementioned problems associated with the prior art. Further aspects of the disclosure relate to a process for producing such a cover glass and to the use thereof.

The disclosure thus relates to a cover glass having a thickness between 0.1 mm and 2 mm, comprising a silica based glass ceramic, wherein the silica based glass ceramic comprises high quartz solid solution or keatite solid solution as the main crystal phase. The cover glass is in chemically tempered form and has a surface compressive stress of at least 250 MPa and preferably at most 1500 MPa, wherein the stress profile has at least one inflection point, preferably at a depth of the cover glass of more than 10 μm.

A preferred lower thickness limit can generally be 0.4 mm. A preferred upper thickness limit can generally be 0.85 mm.

Such a configuration is very advantageous.

The cover glass comprises a silica based glass ceramic, meaning that it is already a chemically very resistant component. A silica based glass ceramic in the context of the present disclosure is understood to mean a glass ceramic comprising $SiO_2$ and preferably including a crystal phase including, as a structural unit, an $SiO_4^{4-}$ tetrahedron, i.e. what is called a crystalline silicate. A silica based glass ceramic inherently already brings good mechanical stability, however, it has to be kept in mind that different strength specifications and test settings can lead to results in which this good mechanical strength of a glass ceramic compared to that of the corresponding green glass may not be as apparent or obvious as in commonly known strength measurements such as bending strength or shock strength that usually are indicated by the glass industry. In addition, the cover glass is in chemically tempered form, namely having a CS (compressive stress) of at least 250 MPa and preferably at most 1500 MPa. In this way, advantageous properties of the cover glass are achievable with regard to the mechanical application tests, for example what are called "set drop tests" relating to the behavior of the cover glass in the installed state in the device, and/or else in ball drop tests, which report resistance to the action of blunt articles or smooth surfaces, such that it is possible to use sufficiently thin and therefore also light cover glasses. The cover glass therefore has a thickness of 0.1 mm to 2 mm. A preferred lower thickness limit can generally be 0.4 mm. A preferred upper thickness limit can generally be 0.85 mm.

It has been found that, surprisingly, for cover glasses according to embodiments, in general, it is possible to obtain a stress profile that has at least one inflection point, preferably within a cover glass depth of more than 10 μm. The inflection point in the stress profile can be at any point, for example even in the region of tensile stress (i.e. below the DoCL).

This is surprising since stress profiles in cover glasses can generally be approximated by a complementary error function and/or by a parabola, i.e. in other words have the shape of an inverted "half-S", as can be seen in the illustrative diagram of such a customary stress profile curve in FIG. 11. A inflection point is not possessed by such stress profiles, at least not in the cover glass itself, i.e. not within a depth of at least 10 μm in the cover glass. A customary stress profile for a chemically tempered cover glass (i.e. a cover glass, the tempering of which has been obtained by ion exchange processes) shows a rapid drop in compressive stress at the surface of the cover glass, which gradually flattens out toward the interior of the cover glass, hence corresponding at least in some regions to the representation of a complementary error function in the first quadrant of the coordinate system.

Such a stress profile is customary, but has the drawback that there is significantly lower compressive stress even at a small cover glass depth than at the surface of the cover glass. The effect of this is that cover glasses are generally tempered at very high compressive stresses at the surface, for example via mixed exchange by means of potassium ions and sodium ions, in order in this way to generate high compressive stress even at relevant depth. This is disadvantageous, however, when an excessively high tensile stress is stored in this way in the cover glass, which then leads to a fine crumbly fracture profile in the event of failure of the cover glass by breakage, which is fundamentally unfavorable for a cover glass of a display device.

But when the compressive stress at the surface ($CS_0$) and/or the compressive stress depth (DoCL) cannot be increased arbitrarily, it is then possible, at least for cover glasses composed of or comprising glass ceramic and under particular conditions, to alter the stress profile progression such that the drop in the stress curve is delayed for as long as possible. At the start of the stress profile—by contrast with conventional progressions which, as stated above, can be approximated or described in parts, for instance, by a complementary error function and/or by a parabola—this leads to a stress plateau in a similar region of high tempering, which is followed by a relatively significant drop in the voltage curve (sigmoidal progression) before the inflection point is attained, see, for example, FIG. 9. In short, this profile progression leads to a rise in compressive stress and hence also in tensile stress by virtue of a different curve progression, with constant $CS_0$ and DoCL. This elevated compressive stress in the front "plateau region" has advantages in respect of blunt impact resistance (for example in what is called a ball drop test), since the cracks in the surface region that arise from the impact can be more effectively stopped, or the force opposing crack proliferation is greater.

Here, the cover glasses according to the present disclosure offer an advantage because the stress profile is configured such that it has at least one inflection point, preferably at a cover glass depth of more than 10 μm. For example, the stress profile of the cover glass according to the disclosure can be in "convex" form, by contrast with the conventional, more "concave" stress profiles of the prior art cover glasses. What is meant here by "convex" is generally a shape having "upward" curvature. "Upward" relates here to compressive stress values in customary stress profiles in which, in a coordinate system, compressive stress is plotted "upward", i.e. in positive y direction, against x, namely the thickness of the cover glass.

In general, such anomalous stress profiles that have at least one inflection point preferably in a cover glass depth of more than 10 μm have the advantage that a relatively large DoCL can be achieved in this way, without any need for a simultaneously very high surface compressive stress. The relatively large DoCL with simultaneously not too high a compressive prestress at the surface offers the advantage that surface scratches or, in particular, sharp impact damage (for example as a result of the penetration of pointed bodies into the glass surface) do not penetrate into the region of the cover glass under tensile stress even at very low penetration depths and hence lead to failure of the cover glass by breakage. At the same time, it is no longer necessary to undertake complex tempering protocols and mixed exchange. More particularly, it has been found that it is possible, even with a single ion exchange, to produce such a tempering profile in a cover glass. This does not rule out that further exchange steps can optionally be undertaken for achievement of further advantages in the stress profile progression. However, this is not absolutely necessary and, according to embodiments, it is possible even with just one ion exchange to specifically improve the strength of the cover glass.

Such anomalous stress profiles that have at least one inflection point, possibly even more than one inflection point, preferably at a cover glass depth of more than 10 μm, are known in principle. For example, documents EP 2 819 966 B1, US 2020/0002225 A1 and US 2010/0009154 A1 also describe tempering profiles in cover glasses made of glass that have anomalous stress profiles with a inflection point. However, for achievement of such anomalous stress profiles, complex processes are necessary, comprising multiple ion exchange and thermal treatments between these ion exchanges. Document US 2021/0292225 A1 likewise discloses anomalous compressive stress profiles with a stress profile having a convex progression in parts, for example in FIG. 1 of US 2021/0292225 A1 relating to example 5. This anomalous compressive stress profile was obtained for a cover glass made of glass ceramic, with glass ceramics having such a progression of the stress profile that is convex at least in parts having been obtained in comparatively complex processes (for example, example H from US 2021/0292225 A1), which, as well as a mixed exchange (potassium and sodium), even comprise an additional step for tempering as well as the ion exchange steps, or relate to specific glass ceramics that have only a low $SiO_2$ content between 50 and 53 mol %, a simultaneously very high $Al_2O_3$ content of more than 30 mol %, and a likewise high $Li_2O$ content of around 10 mol %, and additionally $Y_2O_3$. $Y_2O_3$ is present here in these glass ceramics or the original green glasses because it improves meltability in these glasses having a high $Al_2O_3$ content, which increases the melting point.

$Y_2O_3$ can also be present in the more customary glass ceramics having a higher $SiO_2$ content and a lower $Al_2O_3$ than the above-described glass ceramics according to an embodiment of US 2021/0292225 A1, and in that case is used therein to improve breakage properties, optionally together with other components such as $La_2O_3$ and $Nb_2O_5$.

However, these components, especially the rare earth components $La_2O_3$ and $Y_2O_3$, are unfavorable since they lead to elevated production costs. According to one embodiment, the cover glass or the glass ceramic encompassed by the cover glass therefore comprises $Y_2O_3$, $La_2O_3$ and/or $Nb_2O_5$ only in the form of unavoidable traces of in each case not more than 0.1% by weight.

It has been found that, surprisingly, it is already possible with even just a single ion exchange to obtain an advantageous stress profile having at least one inflection point, preferably at a cover glass depth of more than 10 μm. At the same time, it is also not obligatory for the stress profile to have several inflection points, and it can even by advantageous for the stress profile to have just one inflection point.

The inventors have also found out that it is possible according to embodiments to obtain a stress profile progression having multiple inflection points by only a few exchange steps. In general, the inventors have found that the stress profile comprises 2*n−1 inflection points per ion exchange step, with n being the number of ion exchanges steps. In a second ion exchange step, according to embodiments, a stress profile having 3 inflection points is obtained, and after performance of a third ion exchange step a stress profile having five inflection points is obtained. The number of inflection points relates here to one side of the cover glass. The inflection points here are each disposed at a depth of at least 10 μm in the progression of the stress profile.

Inventors assume that this anomalous stress profile in a cover glass comprising glass ceramic, compared to that of a cover glass comprising a glass of the identical chemical composition as the glass ceramic (here, reference is made in each case to the chemical composition prior to ion exchange) is due to chemical tempering in a glass ceramic is achieved via a different mechanism than in a glass. This mechanism allows for a particularly efficient chemical tempering. In other words, here, with a smaller amount of available ions for exchange it is possible to achieve the same level of tempering—or, inversely, achieve a higher level of tempering in the identical tempering process.

This can be described, by way of example, by indicating the tempering within a chemical glass at a certain depth per mol of ion used (or stored within the cover glass). In particular, this can be, for cover glasses according to embodiments, tempering per mol of sodium ion. This value is referred to as β-value in the scope of the present disclosure and is given, generally, for depth x according to the following equation:

$$\beta(x) = \frac{CS(x) + CT}{c(x)_{Ion} - c(\text{Bulk})_{Ion}} \times \frac{1 - \nu}{E}$$

Here, Ct is the central tension (maximum tensile stress value of the stress profile) and CS(x) is the compressive stress value at depth x. $c(x)_{ion}$ is the concentration of the respective ion, given as oxide, in the respective depth, and $c(\text{bulk})_{ion}$ is the concentration of this ion in the bulk. v refers to Poisson's ratio and E is Young's modulus of the glass or the glass ceramic, respectively. In this way, tempering per exchanged ion can be determined. The β-value thus reflects the tempering efficiency of an ionic species in a glass or glass ceramic under observation in these temperature ranges in which relaxation can be neglected.

It has been found that it can be sufficient for cover glasses according to the disclosure that comprise a silica based glass ceramic comprising high quartz solid solution or keatite solid solution to solely rely upon the sodium ion for determination of the β-value, as this ion has a very high exchange efficiency. However, the given equation refers to a general relationship and can also be used for other ions, especially for potassium.

β-values for a glass ceramic and a glass of the identical chemical composition can be compared.

In the scope of the disclosure, the β-value is regarded as being constant for a given glass or glass ceramic, however, there can be some variations of this value over the depth of the material. In the scope of the present disclosure, for calculation of the β-value, the β-value has been determined at different depths within the glass or glass ceramic article and the arithmetic mean has been calculated. In the scope of the present disclosure, inventors have considered β-values up to a depth of 150 μm. For a glass ceramic, this β-value is greater by a factor of 1.1 to 1.5, preferably 1.1 to 1.4, than in a glass of the identical chemical composition. By way of example, in a cover glass according to an embodiment, a value of 1.26 has been determined. According to embodiments, the built up of stress in a glass ceramic cover glass by ion exchange therefore is far more efficient than in a cover glass comprising of consisting of a glass with an identical chemical composition to that of the respective glass ceramic. Exemplary β-values for cover glasses are in a range between $3*10^{-4}$/mol and $9*10^{-4}$/mol, for example between $4*10^{-4}$/mol and $8*10^{-4}$/mol.

Here, for these indicated values, the indicated β-value refers to sodium as exchanged ion that confers the tempering. In particular, this is valid, especially with reference to the ratio of the β-value in a tempered glass ceramic cover glass according to embodiments and a cover glass comprising glass of an identical chemical composition as the respective glass ceramic, as inventors found that in a lot of glass ceramics according to embodiments sodium is the major contributor to the stress built up and is exchanged in a very efficient manner. However, dependent upon the base composition of the glass or the corresponding glass ceramic, respectively, other ions used for chemical tempering, such as potassium, can be considered as well. For considered glass ceramics according to embodiments, and for the sake of simplicity, however, it is sufficient to consider only stress achieved by sodium ions due to their superior effect on the resulting stress.

Without being limited to any special embodiment of the disclosure, generally, the present disclosure also relates to a cover glass having a thickness between 0.1 mm and 2 mm, comprising a silica based glass ceramic, wherein the silica based glass ceramic comprises high quartz solid solution or keatite solid solution as the main crystal phase, wherein the cover glass is in chemically tempered form, having a surface compressive stress of at least 250 MPa and preferably at most 1500 MPa. The cover glass is characterized by a β-value that is given, according to the following equation:

$$\beta(x) = \frac{CS(x) + CT}{c(x)_{Ion} - c(\text{Bulk})_{Ion}} \times \frac{1 - v}{E}$$

wherein CT is the central tension (maximum tensile stress value of the stress profile), CS(x) is the compressive stress value at depth x, $c(x)_{ion}$ is the concentration of the respective ion, given as oxide, in the respective depth, and $c(\text{bulk})_{ion}$ is the concentration of this ion in the bulk, v refers to Poisson's ratio and E is Young's modulus of the glass ceramic, respectively, wherein preferably the respective ion used for chemical tempering is the sodium ion, and wherein the β-value is in a range between $3*10^{-4}$/mol and $9*10^{-4}$/mol, for example between $4*10^{-4}$/mol and $8*10^{-4}$/mol.

In one embodiment, the stress profile has exactly one inflection point. This can be advantageous because such a stress profile can be obtained even in just a single ion exchange step, and advantageous strength properties are already obtained in this way. Especially in terms of the resistance of the cover glass to the action of blunt articles (blunt impact, tested, for example, in a ball drop test), it is possible here to achieve very advantageous properties that result from the advantageous progression of a stress profile having at least one inflection point, preferably at a depth of the cover glass of at least 10 μm. This is because there is no rapid decrease in compressive stress here at the surface. Even an execution in which only one such inflection point is achieved can therefore lead to a significant improvement in mechanical properties.

The low thickness of the cover glass between 0.1 mm and 2 mm is also advantageous because high transmittances can be achieved in this way. Transmittance is reported in the present context generally as $T_{vis}$, and in one embodiment of the cover glass is more than 80%, preferably more than 85%, in the wavelength range between 380 nm and 780 nm. For comparative purposes, transmittance values are preferably determined at a cover glass thickness of 0.7 mm. For comparative purposes, as to whether they meet this condition, thinner glasses can be stacked in order to achieve a corresponding thickness; thicker glasses can be thinned. In general, these transmittance values are achieved for cover glass thicknesses according to one embodiment between 0.1 mm and 2 mm.

The cover glass in the present context is generally in the form of a pane, in that its thickness is at least one order of magnitude less than length and width. It therefore has two lateral faces (or "sides"), the dimensions of which are determined by length and width, and from which the near-surface layer is determined at right angles in the inward direction toward the core of the cover glass. This near-surface layer is formed on either side of the cover glass. It is preferably in a layer having a depth of 20 μm to 70 μm.

In a preferred embodiment, the glass ceramic comprises keatite or keatite solid solution as the main crystal phase, which is understood to mean that more than 50% by volume of the crystal phases with keatitic crystal structure encompassed by the glass ceramic is present. Preferably, up to 98.5% by volume of the crystal phases encompassed by the glass ceramic, or even 100% by volume, can be present with keatitic crystal structure, i.e. as keatite or keatite solid solution. However, it is also possible that the glass ceramic also comprises secondary phases, for example crystalline nucleating agents.

In a further embodiment, the cover glass is characterized by a color value C* of less than 4, preferably of less than 3. In other words, the cover glass has only a very minor tint, such that viewing through the cover glass onto a display behind it is also enabled without disruptive color distortion. The color value C* or $C_{ab}$* is also referred to as chroma and is calculated from the color values a*, b* as follows:

$$C^* = \sqrt{((a^*)^2 + (b^*)^2)}$$

In yet a further embodiment, the cover glass is characterized by a haze of 0.01% to 1% based on a thickness of the cover glass of 0.7 mm. Haze is understood to mean cloudiness. In other words, the cover glass is only slightly cloudy.

In order to achieve a low chromaticity and/or low cloudiness, it can be advantageous for the $TiO_2$ content of the glass ceramic to be limited. $TiO_2$ is a known component of silica based glass ceramics, for example of what are called lithium aluminum silicate glass ceramics, where it can especially serve for efficient nucleation. However, it has been found that this component, even if it does not itself cause coloring, can contribute to coloring of the resulting glass ceramic as a result of cloudiness. The glass ceramic, according to one embodiment, therefore comprises $TiO_2$, preferably to an extent of not more than 4% by weight of $TiO_2$, more preferably to an extent of not more than 3% by weight.

Advantageously, according to one embodiment, the glass ceramic encompassed by the cover glass takes the form of a lithium aluminum silicate glass ceramic, and the crystal phase takes the form of a keatite solid solution. Lithium aluminum silicate glass ceramics are well known as a material, which offers distinct advantages with regard to the production of the glass ceramic. Formation of the glass ceramic such that it comprises keatite solid solution as the crystalline phase (or crystal phase) is also advantageous because it has been found that not every crystal phase in the system of the lithium aluminum silicate glass ceramics has a temperable configuration. However, specifically keatite or keatite solid solution obviously has a crystal structure which is amenable to ion exchange, specifically one in which lithium is exchanged for sodium, and/or sodium and/or lithium for potassium. However, a disadvantage of known keatite solid solution glass ceramics, specifically those that already have intrinsically high strength, is that these glass ceramics usually have high cloudiness. Surprisingly, however, it has been found that cover glasses comprising keatite solid solution glass ceramics are possible, which simultaneously have low cloudiness, only a low level of color, and additionally also high transmittance. The reason for this has not yet been fully understood on the part of the inventors. However, the inventors suspect that this is because of the specific form of the crystal phase, especially in the tempered state, such that the optical properties of the crystal phase and of the residual glass phase are optimized to one another in such a way as to result in small differences in refractive index between these two phases. This reduces cloudiness effects, and could explain why such a form has the advantageous optical properties.

In general, without restriction to any specific embodiment, the glass ceramic according to one embodiment can comprise the following components in % by weight based on oxide:

| | |
|---|---|
| $SiO_2$ | 55-75, preferably 62-72 |
| $Al_2O_3$ | 18-27, preferably 18-23 |
| $Li_2O$ | 2.8-5, preferably 3-5. |

This is a silica based glass ceramic that already has sufficiently good meltability as glass and does not tend to immediate and uncontrolled crystallization. In this general composition range, in particular, known lithium aluminum silicate glass ceramics are producible, which are well known, for example, with regard to melting and ceramization conditions. A lithium content of the glass ceramic is also advantageous because exchange of sodium and/or potassium for lithium is possible in this way.

In one embodiment, the glass ceramic comprises the components $La_2O_3$, $Y_2O_3$ and/or $Nb_2O_5$ merely in the form of unavoidable traces of in each case not more than 0.1% by weight.

In a further embodiment, the glass ceramic comprises MgO, with a preferred upper limit at 8% by weight. More preferably, the glass ceramic does not comprise more than 4% by weight of MgO. MgO is a preferred component because it promotes the formation of keatite solid solutions. This means that a certain content of MgO leads to lowering of the ceramization temperature. In the case of high contents of MgO, however, unwanted secondary phases can form, for example spinel and/or magnesium titanate. This then has an adverse effect on the transparency of the resulting glass ceramic material, especially with regard to the scatter thereof. Therefore, the MgO content in the glass ceramic is advantageously limited within the aforementioned limits.

In one embodiment, the glass ceramic further comprises ZnO, preferably to an extent of not more than 6% by weight, especially preferably not more than 2% by weight. Such a ZnO content can be advantageous because ZnO lowers the viscosity of the glass, such that the green glass of the glass ceramic is more easily meltable. However, ZnO leads to formation of extraneous phases in excessively large contents, for example gahnite, and hence leads to elevated scatter.

Other alkaline earth metal oxides such as CaO, BaO can likewise have a positive effect on melting properties. However, the amount of such RO components (including the oxides of the alkaline earth metals and ZnO) should generally be limited in order to avoid the formation of extraneous phases, as would lead to higher scatter and hence to a reduction in transmittance. In addition, it is especially possible to use the oxides of the heavier alkaline earth metals, such as BaO, SrO, in order to match the refractive index of the residual glass phase to the crystal phase and hence to optimize transmittance.

A particular component of the glass ceramic according to one embodiment is $SnO_2$. $SnO_2$ can act, for example, as refining agent in the melt, and then as nucleating agent in the glass ceramic. The glass ceramic of the cover glass according to one embodiment preferably comprises $SnO_2$, preferably to an extent of not more than 2% by weight. Preference is given to $SnO_2$ contents of at least 0.05% by weight and preferably at most 1.6% by weight. Higher contents of $SnO_2$ lead to a strong tendency to devitrification and hence worsen the producibility of the glass ceramic.

The $ZrO_2$ and $TiO_2$ components can also act as nucleating agents in the glass ceramics in embodiments. It has been found that nucleation and especially the content of nucleating agents in the glass ceramic and the ratio thereof to one another can be decisive in respect of the formation of an only slightly colored silica based glass ceramic having good transmittance and low cloudiness. The glass ceramic, according to one embodiment, therefore comprises $TiO_2$, preferably to an extent of not more than 4% by weight of $TiO_2$, more preferably to an extent of not more than 3% by weight.

A very efficient nucleating agent in the glass ceramic according to one embodiment is additionally also $ZrO_2$. In one embodiment, the glass ceramic therefore comprises $ZrO_2$, preferably to an extent of not more than 5% by weight, especially preferably to an extent of not more than 4% by weight and more preferably to an extent of at least 1.2% by weight.

The glass ceramic can further comprise $Fe_2O_3$, in an amount of up to 0.1% by weight. $Fe_2O_3$ is usually present in the glass ceramics according to embodiments in the form of unavoidable impurities, but at the same time is also beneficial for nucleation, and so a certain content of $Fe_2O_3$ can also be beneficial. In order to obtain a very color-neutral glass ceramic, however, the content of $Fe_2O_3$ should be limited and is preferably not more than 0.02% by weight. In particular, contents between 0.0001% by weight and 0.1% by weight are possible, preferably between 0.0001% and 0.02% by weight. In other words, in general, the $Fe_2O_3$ content in the glass ceramic of the cover glass according to one embodiment is less than 0.02% by weight.

In one embodiment, the ratio of the critical components $TiO_2$ and $ZrO_2$ is subject to the following relationship:

$0\% < (TiO_2+ZrO_2)$ less than 9.5%, preferably 1.2% less than $(TiO_2+ZrO_2)$ less than 9.5%.

It has been found that, with such a sum total of the two nucleating components $TiO_2$ and $ZrO_2$, particularly good values can be achieved with regard to cloudiness and a low color level.

This can generally be achieved even better when a further nucleating component $SnO_2$ is also included in the ratio of the nucleating agents to one another. In a preferred embodiment, it is generally the case that:

$0 \le SnO_2/(ZrO_2+TiO_2) < 0.8$, preferably $0.01 \le SnO_2/(ZrO_2+TiO_2) < 0.7$.

In particular, the glass ceramic according to one embodiment can comprise the following components in % by weight based on oxide:

| | |
|---|---|
| $SiO_2$ | 55-75, preferably 62-72 |
| $Al_2O_3$ | 18-27 |
| $Li_2O$ | 2.8-5, preferably 3-5 |
| $Na_2O$ | 0-4, preferably 0-2 |
| $K_2O$ | 0-4, preferably 0-2 |
| MgO | 0-8, preferably 0-4 |
| CaO | 0-4, preferably 0-2 |

-continued

| | |
|---|---|
| SrO | 0-4, preferably 0-2 |
| BaO | 0-4, preferably 0-2 |
| ZnO | 0-6, preferably 0-2 |
| $TiO_2$ | 0-4, preferably 0-3 |
| $ZrO_2$ | 0-5, preferably 1.2-4 |
| $B_2O_3$ | 0-2, preferably 0-0.1 |
| $Fe_2O_3$ | 0.0001-0.1, preferably 0.0001-0.02 |
| $SnO_2$ | 0-2, preferably 0.05-1.6 |

where the following condition is preferably applicable to the sum total of the $TiO_2$ and $ZrO_2$ components:

$0\% < \Sigma(TiO_2+ZrO_2) < 9.5\%$, preferably $1.2\% < \Sigma(TiO_2+ZrO_2) < 9.5\%$.

In one embodiment, the glass ceramic of the cover glass comprises crystal phases having a crystallite size of 120 nm or less. The crystallites encompassed by the glass ceramic are preferably at most 90 nm or smaller.

Particular preference is given to an embodiment in which the glass ceramic of the cover glass is free of $As_2O_3$ and/or $Sb_2O_3$. What is meant by "free of" these components in the context of the present disclosure is that these components are present solely in the form of unavoidable impurities or traces, in a content of not more than 500 ppm each, based on weight, preferably not more than 100 ppm, based on weight.

In a further embodiment, the cover glass is characterized by a sharp impact resistance, determined in a set drop test, of between at least 120 cm and up to 200 cm of drop height, preferably determined for a cover glass with a thickness of 0.7 mm. In order to determine sharp impact resistance for not tempered glasses or glass ceramics, preferably a sandpaper having grain size 180 is used in order to obtain values that can be depicted. In contrast, for tempered glasses and glass ceramics, preference is given to using a sandpaper having grain size #60 in order to determine sharp impact resistance.

What is meant by a "sharp impact" resistance in the context of the present disclosure is that a smartphone dummy containing the glass to be tested falls by means of a drop device onto a rough surface such that a multitude of small, pointed articles (e.g. grains of sand of asphalt, concrete or sandpaper) can penetrate into the glass to be tested. In other words, what this involves is the effect of one or more pointed articles, i.e., for example, particles having very small radii of curvature or where the angle of a proportion of the peaks is less than 100°.

Glass ceramic cover glasses of the keatite type according to one embodiment, having chemical tempering of the crystalline phase, achieve average drop heights here of about 172 cm, i.e. about 4 times as high as the same type of glass that has been ceramized but that has not been tempered, and where the chemical tempering has traditionally been built up in the glass phase and which has an average drop height of 42 cm. Similarly tempered glass ceramic cover glasses of the keatite type according to another embodiment confirm the high drop height at about 156 cm (see FIG. 8).

In one embodiment, the cover glass takes the form of a cover glass tempered with sodium ions. The cover glass may have been tempered exclusively with sodium ions, which is possible especially on account of the high selectivity of the tempering by sodium in glass ceramics according to embodiments, even in the case of salts of "technical grade" purity or even in the case of mixed salts that include a high content in potassium (for example about 90% $KNO_3$. In a further embodiment, however, it can be advantageous when a certain proportion of lithium ions is included in the exchange bath, for example up to 0.1% by weight of lithium salt, for example 0.1% by weight of $LiNO_3$ in an exchange bath of otherwise $NaNO_3$. In a further embodiment, the cover glass is in the form of a cover glass tempered with potassium ions, especially in the form of a cover glass tempered solely with potassium ions. The purity of the potassium exchange bath here is 99.9% (based on weight).

In general, according to embodiments, it is also possible that the cover glass is a cover glass tempered with sodium and potassium ions.

In one embodiment, there is only one ion exchange, wherein the exchange bath preferably comprises $NaNO_3$ and optionally up to 0.1% by weight of $LiNO_3$ or comprises $KNO_3$ having a purity of 99.9%, based on weight.

It has been found that, specifically in the case of pure tempering by means of sodium, particularly advantageous executions are obtained. In particular, it is possible here, even within relatively short tempering times, on account of the high selectivity of ion exchange, to obtain advantageous stress profiles and, correspondingly, mechanical properties, especially with respect to the so called set drop resistance. With respect to other resistance and strength values, for example 4-point bending strength, it can however, be advantageous to conduct a potassium tempering or, more generally a mixed ion exchange.

In a further embodiment, the glass ceramic of the cover glass does not comprise any lithium metasilicate as crystal phase. This is advantageous since the glass ceramic in this way is especially configured such that crystal phases that come from the advantageous and selective exchange process as described above are encompassed by the glass ceramic, especially keatite solid solutions.

The present disclosure also relates to a process. The process for producing a cover glass, especially a cover glass according to one embodiment, comprises the steps of:

- producing a silica based green glass by a melting process, followed by hot shaping,
- thermal treatment of the silica based green glass, wherein at least one nucleation step is performed within a temperature range of 650° C.-850° C., preferably of 690° C.-850° C., for a duration of 5 min to 60 h, preferably to 8 h, more preferably 30 min to 2 h, and at least one ceramization step within a temperature range of 700° C.-1100° C., preferably of 780° C.-1100° C., for a duration of 3 min to 120 h, preferably to 60 h, preferably 3 min to 8 h,
- performing at least one ion exchange in an exchange bath having a composition of 100% by weight to 0% by weight of $KNO_3$ and/or 0% by weight to 99.9% by weight of $NaNO_3$ and 0% by weight-5% by weight of $LiNO_3$ at exchange bath temperature between 360° C. and 500° C. and for a duration between 2 hours and 50 hours.

The cooling rate is preferably between 2° C. and 50° C./min.

In general, it is possible to conduct one or more further exchange steps, for example in one or more further steps with an exchange bath having a composition between 90% by weight of $KNO_3$ and 10% by weight of $NaNO_3$ up to 100% by weight of $KNO_3$ or between 70, preferably 50,% by weight of $NaNO_3$ and 30, preferably 50,% by weight of $LiNO_3$ up to 100% by weight of $NaNO_3$ at temperatures between 360° C. and 500° C. and a duration between a half hour and up to 20 hours.

The measurements of the characteristics of the chemical tempering, CS 0 (compressive stress at the surface of the cover glass), CS 30 (compressive stress or generally stress at a depth of 30 μm) and DoCL (depth of compression layer, sometimes also called exchange depth), can be determined by means of suitable measuring devices, for example the SLP-1000 and the FSM 6000 measuring device. However, DoCL is not identical to ion exchange depth.

The present disclosure therefore also relates generally to a cover glass produced or producible in a process according to one embodiment.

The present disclosure further relates to the use of a cover glass according to one embodiment or produced in a process according to one embodiment in electronic devices, especially in electronic display devices, especially in mobile electronic display devices, for example in mobile touch panels and/or mobile digital display devices such as smartphones or smartwatches and generally touch panels. The present disclosure additionally also relates to a display device, especially a digital display device, such as a touch panel or a smartwatch or a smartphone comprising a cover glass according to embodiments and/or produced in the process according to embodiments.

An exchange bath is understood to mean a salt melt, this salt melt being used in an ion exchange process for a glass or glass article. In the context of the present disclosure, the terms “exchange bath” and “ion exchange bath” are used synonymously.

In general, salts in technical grade purity are used for exchange baths. This means that, in spite of the use of, for example, solely sodium nitrate as starting material for an exchange bath, certain impurities can also be included in the exchange bath. The exchange bath here is a melt of a salt, i.e., for example, of sodium nitrate, or of a mixture of salts, for example a mixture of a sodium salt and a potassium salt. The composition of the exchange bath is specified here such that it relates to the nominal composition of the exchange bath without taking account of any impurities present. If, therefore, reference is made to a 100% sodium nitrate melt in the context of the present disclosure, what this means is that the raw material used was solely sodium nitrate. However, the actual sodium nitrate content of the exchange bath can differ therefrom and generally will, since technical raw materials in particular have a certain proportion of impurities. However, this is generally less than 5% by weight, based on the total weight of the exchange bath, especially less than 1% by weight.

However, it is also possible and can also be advantageous in certain circumstances when particularly pure salts are used, i.e. salts not in technical grade purity but, for example, in analytical quality. This can be advantageous especially when a cover glass amenable to very selective ion exchange is to be tempered. This is because it has been found that particular glass ceramics are amenable to such a very selective ion exchange and, preferably, exchange only of a particular ion, for example of sodium, takes place, in which case exchange for potassium does not take place. This high selectivity of particular embodiments of glass ceramics or of cover glasses has the effect that, in the presence of minor impurities, only the impurity is exchanged, meaning that, for example, only sodium exchange would take place in a $KNO_3$ exchange bath of technical grade purity with a $NaNO_3$ content of about 0.5% by weight.

Therefore, in an illustrative embodiment, it can be the case that salts with a 3n purity (99.9% pure, based on weight) are used, especially when only exchange for a particular ion is intended. If such salts are used, this is stated specifically. However, it is preferably possible to use salts of technical grade purity since these are much less expensive than high-purity salts. The purity here is typically 2n, i.e. 99.5%, for example, based on weight.

Advantageously, in one embodiment, there is only one ion exchange, in which case the exchange bath consists preferably of pure $NaNO_3$ or pure $KNO_3$, where unavoidable impurities can be present up to a total content of 0.01% by weight. This is a particularly simple process regime and can therefore be preferable. Specifically in the case of $NaNO_3$ tempering, however, in order to avoid a fine crumbly fracture profile in the event of failure, it can be preferable when not only sodium ions but also lithium ions are present, for example in a concentration up to 0.1% by weight of lithium salt.

In a corresponding manner, in exchange baths comprising a mixture of different salts, the nominal contents of these salts are reported without taking account of impurities in the starting materials for technical reasons. An exchange bath with 90% by weight of $KNO_3$ and 10% by weight of $NaNO_3$ can thus likewise still include minor amounts of impurities, but these are caused by the raw materials and should generally be less than 5% by weight, based on the total weight of the exchange bath, especially less than 1% by weight.

The above remarks relating to the composition of the exchange bath are correspondingly applicable here.

In addition, the composition of the exchange bath will also vary in the course of ion exchange, since the progressive ion exchange will result in migration of lithium ions in particular from the glass or glass article into the exchange bath. However, such a change in the composition of the exchange bath through aging is likewise not taken into account in the present context, unless explicitly stated otherwise. Instead, the context of the present disclosure is based on the nominal original composition in the specification of the composition of exchange bath.

DETAILED DESCRIPTION

Figure 1:
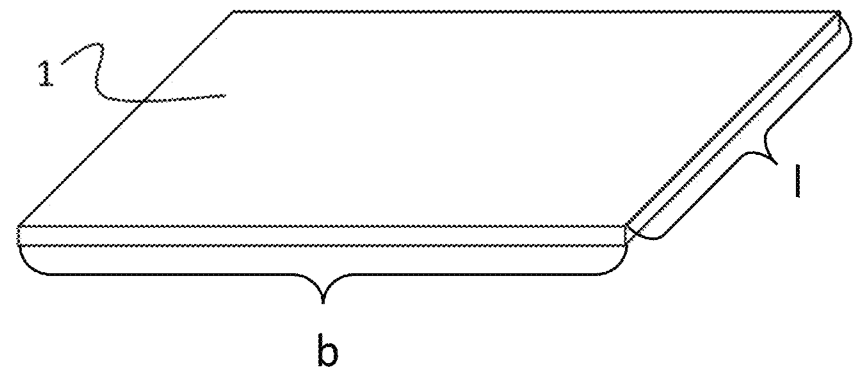
FIG. 1 shows a cover glass according to the present disclosure.

FIG. 1 shows the schematic diagram (not to scale) of a cover glass 1 according to embodiments of the present disclosure. The cover glass 1 in the present case is in the form of a pane or sheet in that its thickness d (not identified in FIG. 1) is at least one order of magnitude less than the length I and width b of the cover glass 1. The cover glass 1 can, as shown by way of example in FIG. 1, be flat or planar or in the form of a curved or bent pane. Other conceivable embodiments are those in which the cover glass has merely slight curvature in the edge region. The two dimensions of length and width determine the two main areas or sides (in some cases also called “surfaces”) of the cover glass 1.

Figure 2:
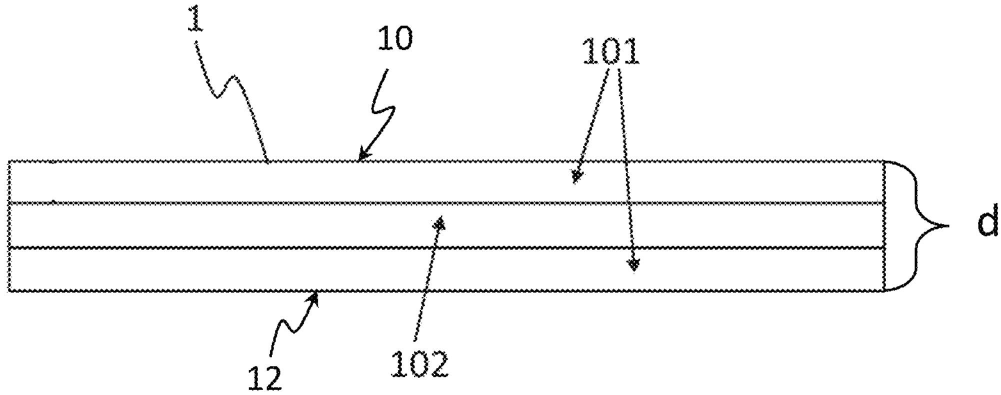
FIG. 2 is a section view of a cover glass according to the present disclosure.

FIG. 2 shows a schematic section diagram (not to scale) of a cover glass 1 according to embodiments of this disclosure. The cover glass 1 has two sides 10, 12 (these sides can also be referred to as "surfaces" or "main surfaces" of the cover glass 1), with the side 10 designed here as top side and the side 12 as bottom side. In addition, the thickness d of the cover glass 1 is identified. The cover glass 1 has a layer 101 disposed between the two sides 10, 12, which is also referred to as "near-surface layer" in the context of the present disclosure. The near-surface layer 101 is formed on either side of the cover glass 1 and can be the same, i.e., for example, have an equal thickness within the scope of measurement accuracy. It can alternatively be possible and even preferable for the thickness of the near-surface layer 101 facing one of the two sides, for example side 10, to have a different thickness than the near-surface layer facing side 12. This can be the case, for example, when the chemical tempering of the cover glass 1 has been executed such that exchange is unequal.

The core 102 lies between the two near-surface layers 101. There can be a further adjoining region between the near-surface layer 101 and the core 102, although not identified in FIG. 2, in which there has been ion exchange, but without contributing anything to compressive stress, for example. The core is generally the region of minimum stress in the cover glass 1. The near-surface layers 101, by comparison, have higher stress; they may especially be under compressive stress. The cover glass 1 generally comprises a silica based glass ceramic, with the cover glass 1 generally having a thickness d between 0.1 mm and 2 mm. A preferred lower thickness limit can generally be 0.4 mm. A preferred upper thickness limit can generally be 0.85 mm. The transmittance, $T_{vis}$, of the cover glass 1 according to one embodiment is more than 80%, preferably more than 85%, in the range from 380 nm to 780 nm, preferably determined for thicknesses between 0.1 mm and 2 mm, especially preferably at a thickness of 0.7 mm. The cover glass 1, as a result of a chemical tempering, the effect of which is that a compressive stress is obtained, at least in a near-surface layer 101 or in the two near-surface regions 101, especially in a layer of 20 μm to 70 μm, determined at a right angle from one of the lateral faces 10, 12 of the cover glass 1, is present as a chemically tempered cover glass, with the stress profile having at least one inflection point, preferably at a cover glass depth of more than 10 μm. The crystal phase encompassed by the glass ceramic of the cover glass 1 can preferably be a silica based crystal phase. As a result of the chemical tempering, the cover glass 1 has a CS of at least 250 MPa and preferably of at most 1500 MPa.

FIGS. 3 to 6 relate to the performance of what is called the set drop test for determination of set drop resistance.

Figure 3:
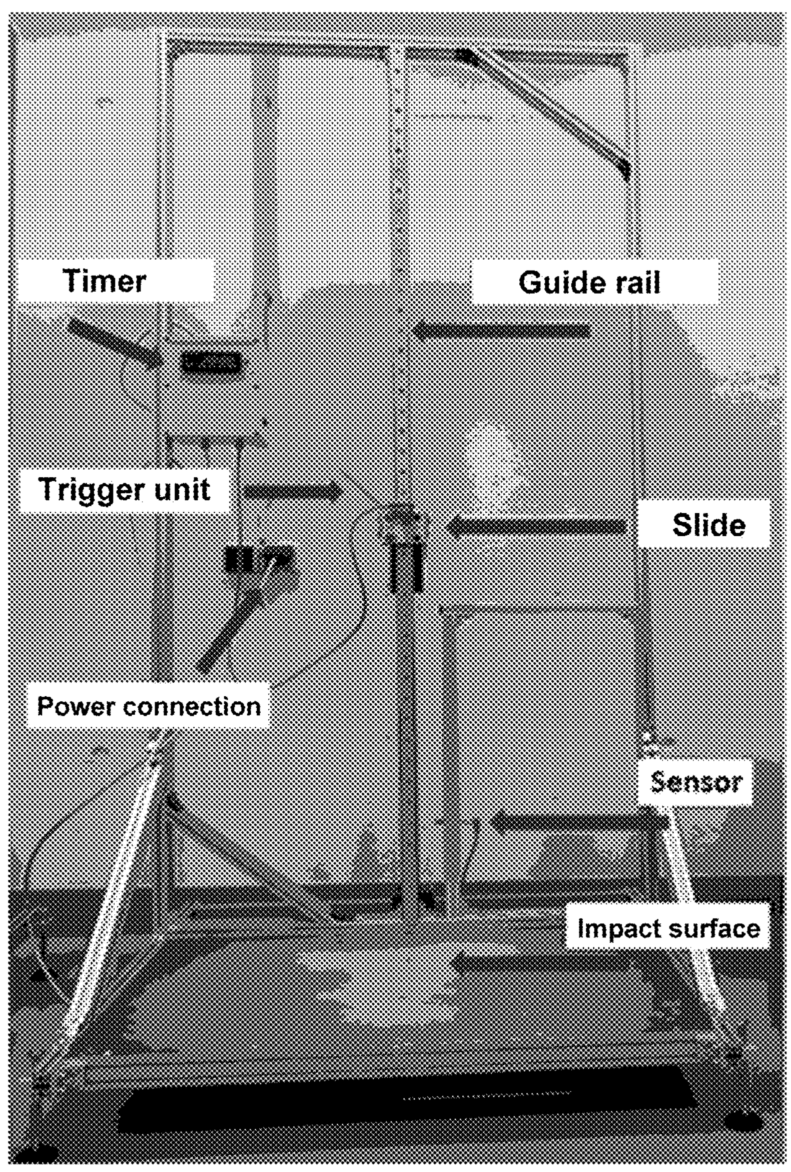
FIG. 3 shows an overall view of the set drop test setup.
Figure 4:
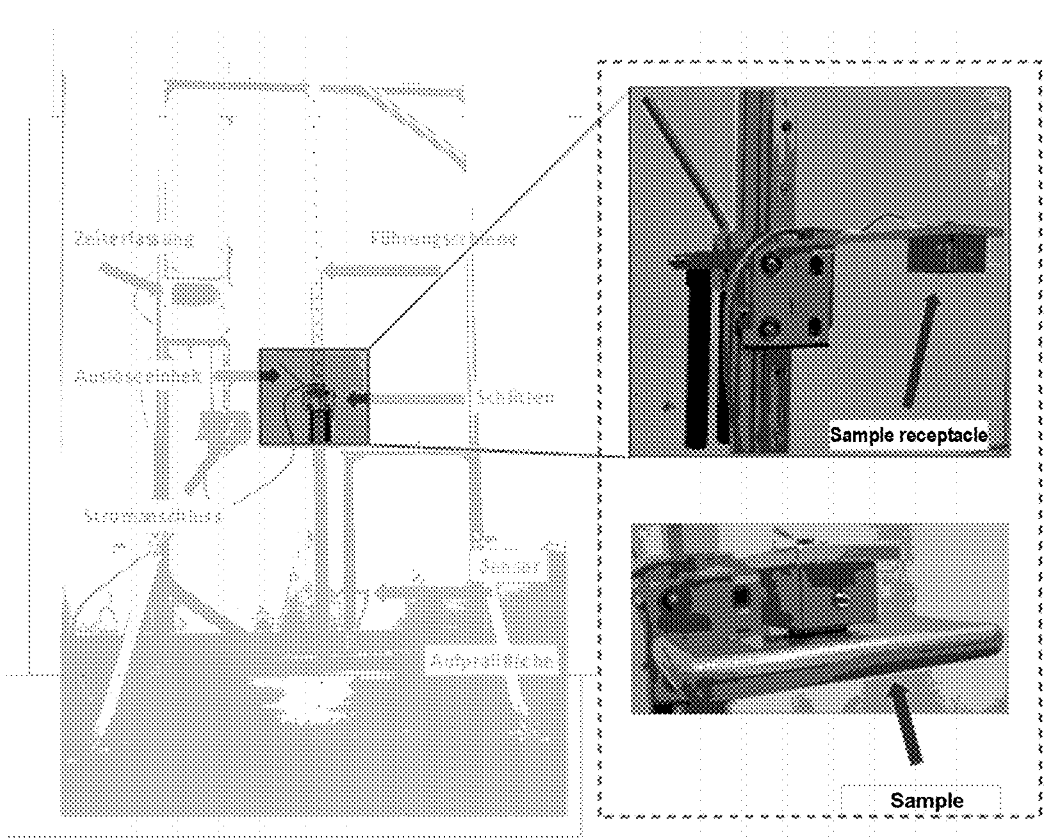
FIG. 4 shows a sample receptacle and trigger mechanism of the set drop test setup.
Figure 5:
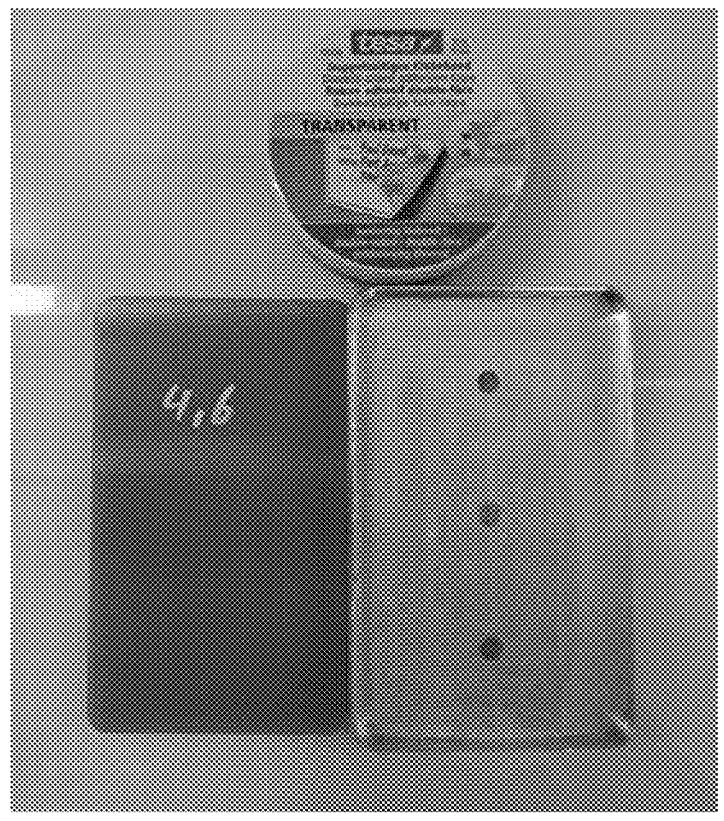
FIG. 5 shows an aluminum housing and plastic sheet as a sample receptacle and sample dummy.
Figure 6:
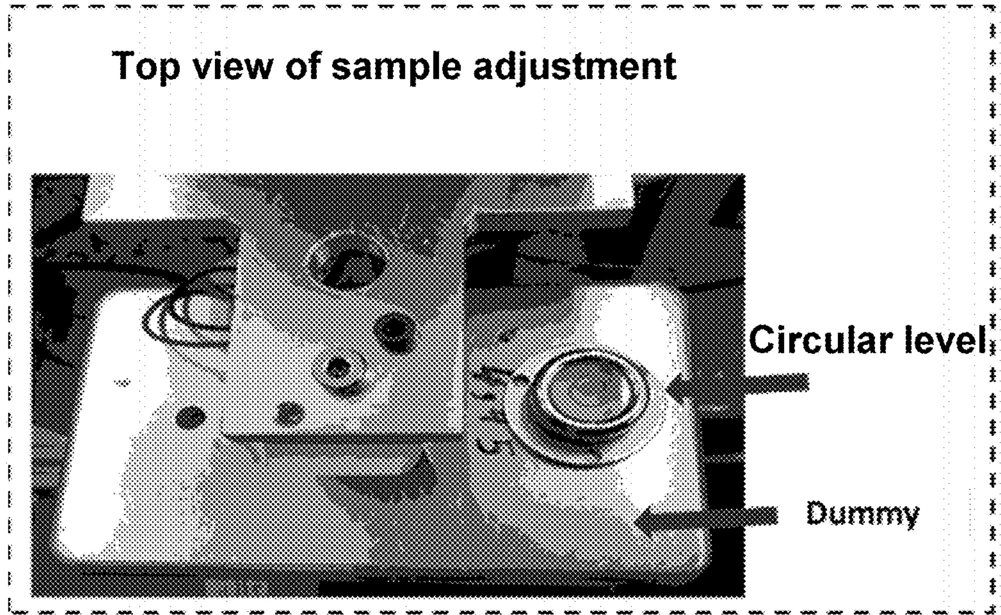
FIG. 6 shows alignment of the sample dummy in the sample receptacle of FIG. 4 by means of 2D water level.

The set drop test is preferably conducted as follows:

A cover glass is fixed on a sample receptacle and allowed to fall from accumulating drop heights onto a defined floor. An overview of the overall structure is shown in FIG. 3. The cover glass used in the set drop test in FIG. 5 has a length of 99 mm and a width of 59 mm, and, as shown in FIG. 4, is fixed magnetically with a sample dummy in the sample receptacle. For the studies outlined in the present disclosure, in a departure from the sample representation in FIG. 4, however, cover glass formats of 49.5 mm×49.5 mm were used, without affecting the basic construction of the test procedure in FIGS. 3 to 6, while the weight of the dummies were reduced accordingly.

First of all, a polymer sheet is stuck with the aid of double-sided adhesive tape into a metal housing having the shape and weight of a holder for an ultimate mobile device, for example a smartphone. Suitable plastic sheets here are for example those having thicknesses between 4.35 mm and 4.6 mm (see FIG. 5). They are preferably stuck in by means of a double-sided adhesive tape having a thickness of about 100 μm (for studies with chemically tempered cover glasses comprising glass or glass ceramic) or 295 μm, respectively (for studies with cover glasses comprising glass or glass ceramic that had not been tempered). Then, by means of a double-sided adhesive tape, preferably a double-sided adhesive tape of thickness 295 μm, especially a double-sided adhesive tape of the Tesa® brand, product number 05338, the glass article to be tested in the form of a pane is stuck onto the plastic sheet in such a way that a distance between 350 μm and 450 μm is obtained between the top edge of the housing/holder and the top edge of the glass article. The cover glass lies higher than the housing frame, and there must be no occurrence of direct contact between cover glass and aluminum housing. The set thus obtained with a weight of 177.5 g, which simulates the incorporation of a cover glass into an ultimate mobile device and is a kind of dummy for a real ultimate mobile device, a smartphone here in particular, is subsequently allowed to drop downward onto an area of DIN A4 size, called the impact area, by the glass side with an initial speed in vertical direction, and hence a fall direction of zero. The impact area is produced here as follows: Sandpaper with an appropriate grain size, for example grain size 60 (#60), is stuck onto a baseplate by means of a double-sided adhesive tape, for example an adhesive tape of thickness 100 μm (for studies with chemically tempered cover glasses comprising glass or glass ceramic) or 3*100 μm, respectively (for studies with cover glasses comprising glass or glass ceramic that had not been tempered). The adhesive tape used was Tesa® (10 m/15 mm), transparent, double-sided, product number 05338. Grain size in the context of the present disclosure is defined according to the standards of the Federation of European Producers of Abrasives (FEPA); for examples thereof see also DIN ISO 6344, especially DIN ISO 6344-2:2000-04, Coated abrasives-Grain size analysis-Part 2: Determination of grain size distribution of macrogrits P 12 to P 220 (ISO 6344-2:1998). The weight of the baseplate, which, with the values disclosed in the present context, is an aluminum base, is about 3 kg.

The baseplate must be firm and is preferably formed from aluminum or else alternatively from steel. The sandpaper must be completely covered with adhesive tape and stuck down without bubbles. The impact surface must be used only for five drop tests and should be exchanged after the fifth drop test. The sample, i.e. the set obtained, is inserted into the test apparatus and aligned by means of a 2D water level (circular level) such that the set is horizontal, with the cover glass facing the floor, i.e. in the direction of the impact area (see FIG. 6). The first drop height is 20 cm; if no breakage occurs, the drop height is increased in 10 cm steps until glass breakage occurs. The breakage height, the breakage origin and the breakage appearance are noted. The test is conducted on 10 to 15 samples, and an average is formed.

Figure 7A:
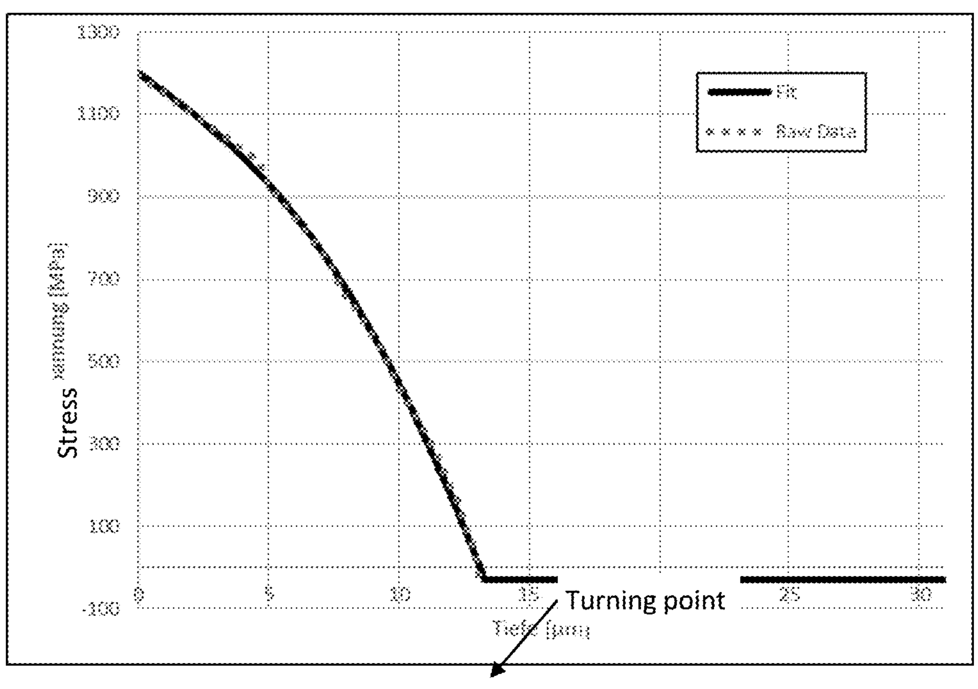
FIGS. 7*a-b*, 8*a-b*, and 9 to 11 show data and graphs according to the present disclosure.
Figure 7A:
Figure 7B:
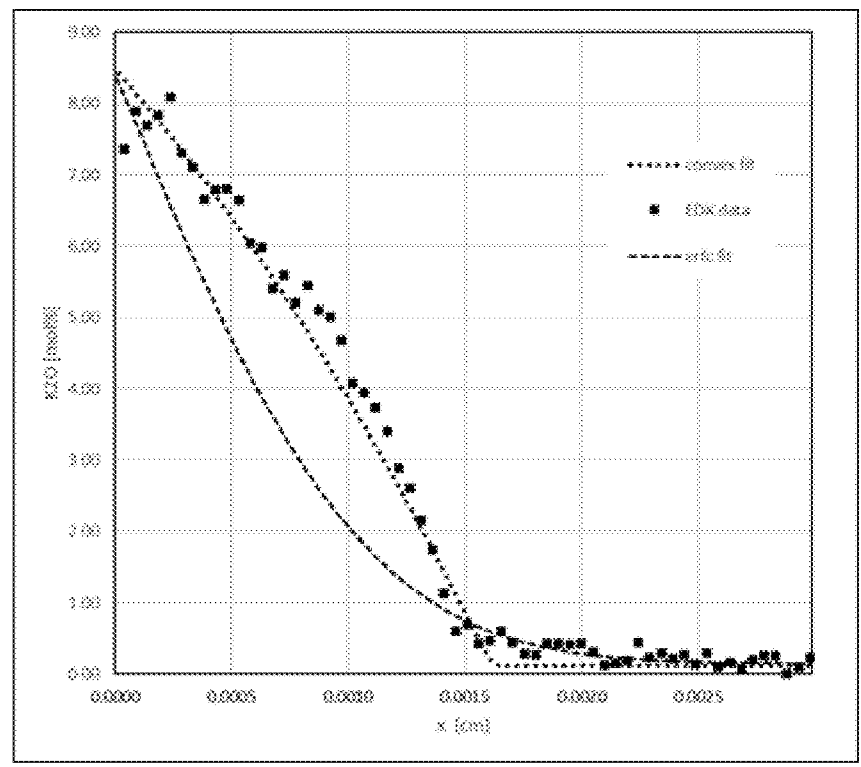

FIG. 7*a* shows a stress profile and FIG. 7*b* shows an EDX curve of a first cover glass according to one embodiment of the disclosure, in which tempering was effected by means of potassium ions. The approximate position of the inflection point in the stress profile is identified in FIG. 7*a*. FIG. 7*b* shows the progression of the potassium oxide concentration versus the depth of the cover glass (plotted on the x axis). As well as the measurement points (filled square), the convex fit to these data (dotted line) is shown, which clearly shows the anomalous progression of the concentration curve (which, as is well known, translates into the stress profile). By way of comparison, the "conventional" expected progression of a concentration profile is also shown, which can typically be described by a complementary error function, i.e., the dotted line in FIG. 7*b*.

Figure 8A:
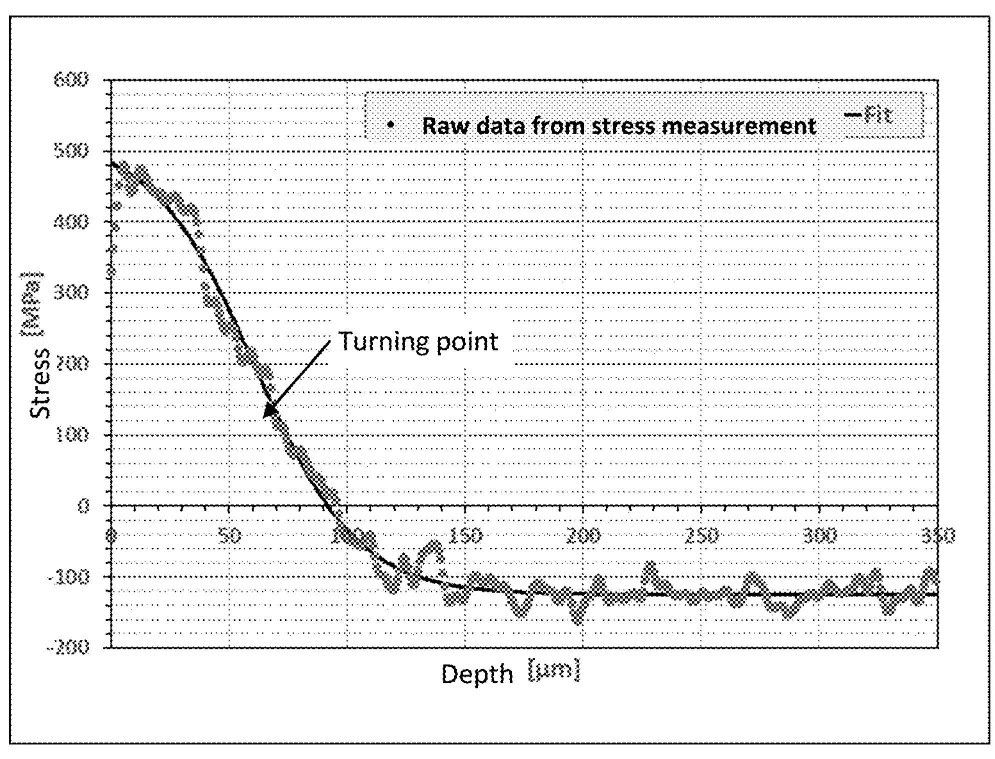
Figure 8B:
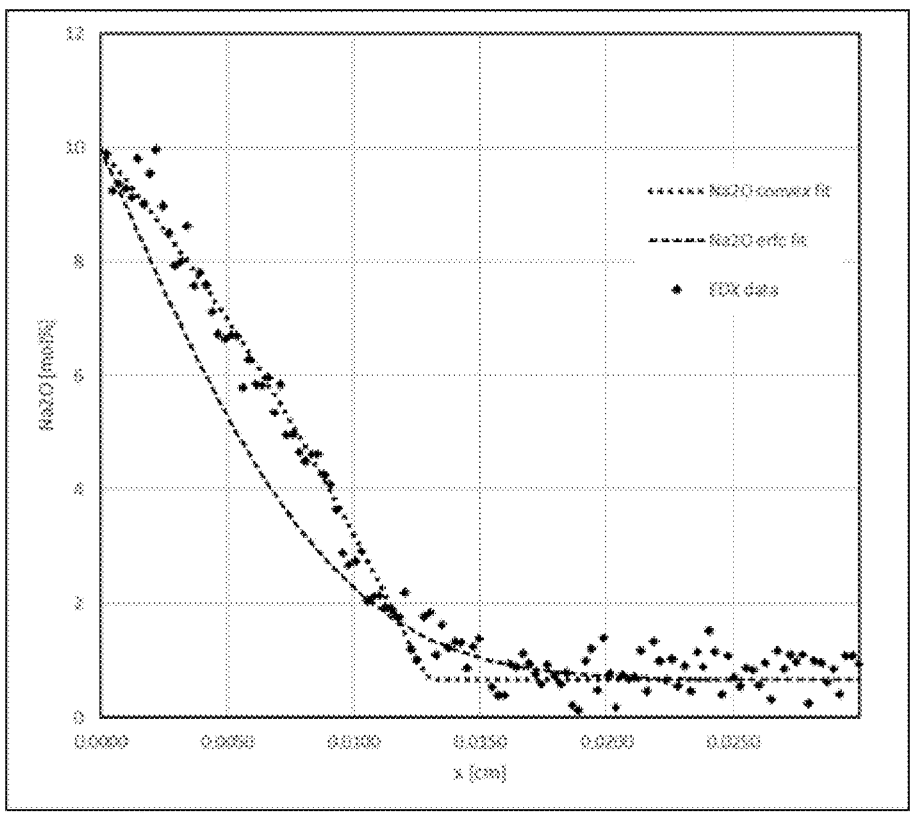

FIG. 8*a* shows a stress profile and FIG. 8*b* shows an EDX curve of a first cover glass according to one embodiment of the disclosure, in which tempering was effected by means of sodium ions. The approximate position of the inflection point in the stress profile is identified in FIG. 8*a*. FIG. 8*b* shows the progression of the sodium oxide concentration versus the depth of the cover glass (plotted on the x axis). As well as the measurement points (filled square), the convex fit to these data (dotted line) is shown, which clearly shows the anomalous progression of the concentration curve (which, as is well known, translates into the stress profile). By way of comparison, the "conventional" expected progression of a concentration profile is also shown, which can typically be described by a complementary error function, i.e., the dotted line in FIG. 8*b*.

Figure 9:
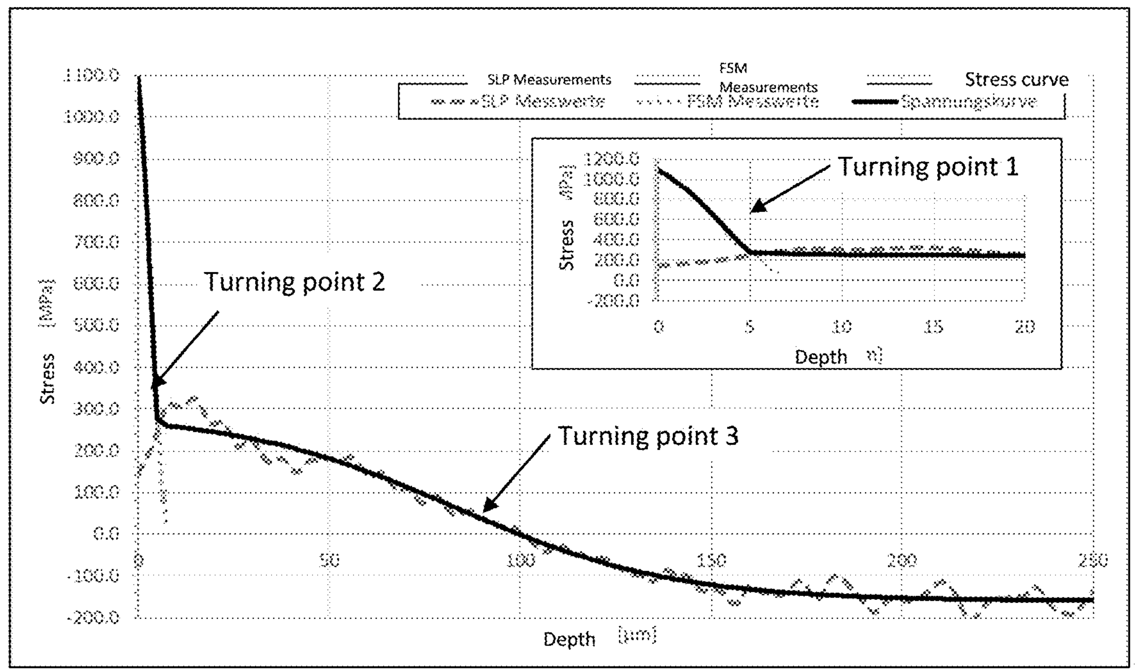

FIG. 9, finally, shows a stress profile that has been obtained after a double ion exchange. The stress profile has three inflection points that are given approximately in the diagrams of FIG. 9.

In FIGS. 7*a* to 9, at least one inflection point at a depth of the cover glass of at least 10 μm or more is encompassed by the stress profile.

Figure 10:
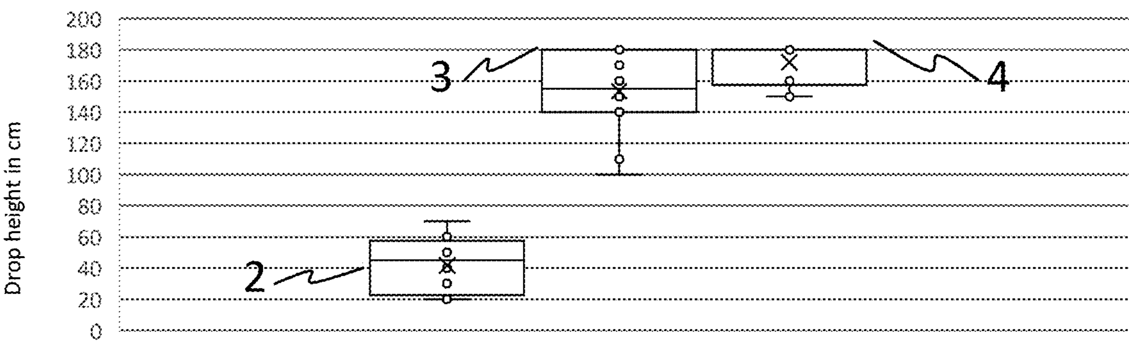

FIG. 10, finally, shows a comparison of the set drop resistance of different cover glasses. 2 here denotes the results that are obtained with drop heights for prior art chemically tempered glass. 3 denotes results for a cover glass according to a first embodiment that has been tempered in a pure sodium bath (100% $NaNO_3$) at 440° C. for 14 h. Finally, 4 denotes the result for a cover glass according to a further embodiment that has been tempered in a pure sodium exchange bath (100% $NaNO_3$) at 440° C. for nine hours. The results of the set drop test are also compiled in the table below. The drop heights are each reported in cm.

Examples

The compositions of the glass ceramic materials according to the disclosure can be found in Table 1.

The materials listed in Table 1 were melted and refined using raw materials customary in the glass industry at temperatures of 1600 to 1680° C. The batch was first melted here in sintered silica glass crucibles and was then decanted into Pt/Rh crucibles with inner silica glass crucibles and homogenized by stirring at temperatures of about 1550° C. for 30 minutes. After being left to stand at 1640° C. for 2 h, castings of about 140 mm×100 mm×30 mm in size were made and annealed in a cooling oven at about 620 to 680° C. and cooled down to room temperature. The castings were used to prepare the test specimens for the measurement of the properties in the vitreous state and for the ceramizations.

For the ceramizations, in general, two-stage programs were used, which are specified in Table 1. In these, the starting glasses were heated from room temperature firstly to a nucleation temperature above $T_g$, and kept at that temperature for a period sufficient for nucleation. Subsequently, the samples are heated to the ceramization temperature and likewise kept at that temperature. It is also possible to use three- or multistage programs (example 2 in Table 1). Hold times can also be replaced by slow heating rates.

The ceramized samples were used to determine, with the aid of XRD, crystal phases and the contents thereof and transmittance in the visible region $T_{vis}$ (on samples having thickness 0.7 mm) and color values in the Lab system (standard illuminant C).

The crystal phase contents reported in Table 1 were determined with the aid of x-ray diffraction measurements using a Panalytical X'Pert Pro diffractometer (Almelo, the Netherlands). The x-radiation used was CuKα radiation generated by means of an Ni filter (λ=1.5060 Å). The standard x-ray diffraction measurements on powder samples and solid-state samples was conducted using Bragg-Brentano geometry (θ-2θ). The x-ray diffraction diagrams were measured between 10° and 100° (2θ angle). The relative crystalline phase components were quantified, and the crystallite sizes determined, via a Rietveld analysis. Measurement was effected on ground sample material, as a result of which the volume fraction of the core region is distinctly dominant. The measured phase fractions therefore correspond to the phase distribution in the core of the glass ceramic. The "V" samples correspond to comparative examples. The examples that have merely been numbered are examples of embodiments.

TABLE 1

| Examples | V1 | V2 | 1 | 2 | 3 |
|---|---|---|---|---|---|
| $Al_2O_3$ | 19.95 | 19.95 | 22.50 | 19.86 | 21.70 |
| $As_2O_3$ | 0.85 | 0.85 | | | |
| $B_2O_3$ | | | 0.20 | | |
| BaO | 0.84 | 0.84 | | 2.26 | 0.55 |
| CaO | | | 0.02 | 0.43 | 0.25 |
| Cl | | | | | |
| $Fe_2O_3$ | | | | 0.012 | 0.015 |
| $HfO_2$ | | | | | |
| $K_2O$ | 0.19 | 0.19 | 0.20 | 0.27 | 0.32 |
| $Li_2O$ | 3.67 | 3.67 | 4.40 | 3.95 | 3.64 |
| MgO | 1.07 | 1.07 | 1.02 | 0.27 | 0.32 |
| $Na_2O$ | 0.15 | 0.15 | 0.65 | 0.61 | 0.15 |
| $Nd_2O_3$ | 0.06 | 0.06 | 0.24 | | 0.05 |
| $P_2O_5$ | | | 0.20 | | 0.03 |
| $Sb_2O_3$ | | | | | |
| $SiO_2$ | 67.31 | 67.31 | 65.50 | 66.64 | 66.40 |
| $SnO_2$ | | | 0.54 | 0.12 | 0.07 |
| SrO | | | | | 0.50 |
| $TiO_2$ | 2.29 | 2.29 | 1.60 | 2.20 | 2.20 |
| $V_2O_5$ | | | | | |

TABLE 1-continued

| | | | | | |
|---|---|---|---|---|---|
| ZnO | 1.70 | 1.70 | 0.44 | 1.50 | 1.94 |
| $ZrO_2$ | 1.76 | 1.76 | 1.95 | 1.90 | 1.85 |
| NaCl | | | 0.12 | | |
| TOTAL | 99.84 | 99.84 | 99.58 | 100.02 | 99.99 |
| $SnO_2/(TiO_2 + ZrO_2)$ | 0.00 | 0.00 | 0.15 | 0.03 | 0.02 |
| Density [g/cm$^3$] | | 2.512 | | | |
| Ceramization | 760° C./30 min + 900° C./10 min | 760° C./30 min + 990° C./5 min | 760° C./60 min + 990° C./8 min | 795° C./60 min + 930° C./60 min + 975° C./5 min | 760° C./60 min + 1000° C./12 min |
| Main crystal phases | HQMK | KMK | KMK | KMK | KMK + HQMK |
| Relative proportion of KMK | n.d. | n.d. | 96 | 96 | 86 |
| $\tau_{vis}$ (C/2) 0.7 mm | 90.3 | 76.6 | 80.2 | 87.6 | 84.9 |
| YI (std. ill. C yellow) | 1.7 | | | | |
| L* | 96.13 | 90.1 | 91.8 | 95 | 94.1 |
| a* | −0.14 | −0.1 | −1.2 | −0.1 | 1.2 |
| b* | 0.77 | 8.6 | 9.1 | 1.5 | 4.4 |
| C* | 0.78 | 8.6 | 9.2 | 1.5 | 4.6 |

| Examples | V3 | V4 | 4 | 5 | 6 |
|---|---|---|---|---|---|
| $Al_2O_3$ | 20.50 | 21.98 | 22.02 | 19.35 | 19.35 |
| $As_2O_3$ | | | | | |
| BaO | 1.92 | | 1.23 | | |
| CaO | | 0.02 | 0.02 | 0.03 | 0.20 |
| $Fe_2O_3$ | 0.014 | 0.008 | 0.008 | 0.018 | 0.010 |
| $HfO_2$ | | | | | |
| $K_2O$ | | | | | 0.50 |
| $Li_2O$ | 3.20 | 3.59 | 3.68 | 4.25 | 4.50 |
| MgO | 0.10 | 0.75 | 1.20 | 1.26 | 0.50 |
| $Na_2O$ | 0.52 | 0.38 | 0.39 | 0.06 | 0.50 |
| $P_2O_5$ | | 1.37 | 1.36 | | |
| $SiO_2$ | 67.40 | 67.70 | 65.90 | 70.90 | 68.50 |
| $SnO_2$ | 0.07 | 1.22 | 1.24 | 1.59 | 1.50 |
| SrO | | | 0.01 | | 0.50 |
| $TiO_2$ | 2.31 | 0.01 | 0.01 | 0.02 | |
| ZnO | 1.42 | | | | 1.50 |
| $ZrO_2$ | 1.80 | 2.92 | 2.93 | 2.44 | 2.50 |
| TOTAL | 99.25 | 99.94 | 100.00 | 99.92 | 100.06 |
| $SnO_2/(TiO_2 + ZrO_2)$ | 0.02 | 0.42 | 0.42 | 0.65 | 0.60 |
| $T_g$ | 701 | | 725 | | 700° C. |
| Ceramization | 760° C./60 min + 1000° C./12 min | 760° C./60 min + 1000° C./12 min | 760° C./60 min + 980° C./8 min | 760° C./60 min + 990° C./12 min | 740° C./3 h + 830° C./10 min |
| Main crystal phases | HQMK | HQMK | KMK | KMK | KMK |
| Relative proportion of KMK | — | — | 97.4 | 94.5 | 98.2 |
| KMK crystallite size (nm) | n.d. | n.d. | 68 | 69 | 69 |
| Transmittance D = 0.8 mm | n.d. | n.d. | n.d. | n.d. | n.d. |
| $\tau_{vis}$ (C/2) 0.7 mm | 88.9 | 83.4 | 80.6 | 90 | 82.5/4 mm |
| YI (std. ill. C yellow) | | | | | |
| Standard illuminant C | | | | | |
| L* | 95.5 | 93.2 | 91.9 | 96 | 92.8 |
| a* | −0.3 | −0.1 | 0.4 | −0.1 | −0.7 |
| b* | 2.4 | 5.6 | 3.2 | 1.2 | 6.1 |
| C* | 2.4 | 5.6 | 3.2 | 1.2 | 6.2 |

| Examples | 7 | 8 | 9 |
|---|---|---|---|
| $Al_2O_3$ | 19.35 | 26.20 | 30.71 |
| $As_2O_3$ | | | 0.50 |
| BaO | | | |
| CaO | 0.20 | 2.44 | |
| $Fe_2O_3$ | 0.010 | | |
| $K_2O$ | 0.50 | | 6.13 |
| $Li_2O$ | 4.50 | 4.32 | |
| MgO | 0.50 | 0.25 | |
| $Na_2O$ | 0.50 | 0.51 | 12.36 |
| $P_2O_5$ | | | |
| $SiO_2$ | 68.50 | 59.20 | 41.25 |
| $SnO_2$ | 1.50 | 0.47 | |
| SrO | 0.50 | | |
| $TiO_2$ | | | 7.37 |
| ZnO | 1.50 | 1.81 | |
| $ZrO_2$ | 2.50 | 4.16 | 1.67 |
| TOTAL | 100.06 | 99.46 | 100.00 |
| $SnO_2/(TiO_2 + ZrO_2)$ | 0.60 | 0.11 | 0.00 |
| $T_g$ | 700° C. | | |
| Ceramization | 740° C./3 h + 850° C./30 min | 760° C./60 min + 980° C./8 min | 850° C./4 h + 900° C./30 min |

TABLE 1-continued

| | | | |
|---|---|---|---|
| Main crystal phases | KMK | KMK | Nepheline, rutile (tr) |
| Relative proportion of KMK | 98.3 | 96.5 | — |
| KMK crystallite size (nm) | 72 | 81 | Nepheline = 62 nm |
| Transmittance D = 0.8 mm | n.d. | | |
| $\tau_{vis}$ (C/2) 0.7 mm | 90.2 | 82.8 | 82.2 |
| YI (std. ill. C yellow) | | | |
| Standard illuminant C | | | |
| L* | 96.1 | 92.9 | 92.7 |
| a* | −0.2 | 0.1 | −1.3 |
| b* | 1.2 | 2.9 | 8.5 |
| C* | 1.2 | 2.9 | 8.6 |

For tempering tests, ceramized glass ceramic panes having a thickness of 0.7 mm were tempered in various salt baths. Table 2 shows the change in the crystallographic data on tempering of a glass ceramic of the disclosure.

TABLE 2

| | a (Å) | C (Å) | V (Å$^3$) | ΔV |
|---|---|---|---|---|
| Literature value for $Li_{0.75}Al_{0.75}Si_{2.25}O_6$ | 7.505 | 9.070 | 510.91 | |
| Non-tempered | 7.499 | 9.099 | 511.64 | 0 |
| 100% $KNO_3$ | 7.501 | 9.199 | 517.56 | 1.16% |
| | 7.443 | 9.687 | 536.59 | 4.88% |
| 80% $KNO_3$ + 20% $NaNO_3$ + 100% $KNO_3$ | 7.499 | 9.261 | 520.76 | 1.78% |
| 99% $KNO_3$ + 1% $NaNO_3$ | 7.497 | 9.275 | 521.35 | 1.90% |
| 95% $KNO_3$ + 5% $NaNO_3$ | 7.502 | 9.295 | 523.09 | 2.24% |
| 90% $KNO_3$ + 10% $NaNO_3$ | 7.503 | 9.303 | 523.77 | 2.37% |

(Literature value ICDD-PDF #00-035-0794)

The sample after ceramization contains keatite solid solutions as the main crystal phase (96% keatite solid solution, 3% $ZrTiO_4$). After tempering (at temperatures of 420-440° C. for 7.5-18 h), all samples, irrespective of the salt bath selected, had an increase in the size of the unit cell in the near-surface layer of more than 1% compared to the non-tempered sample. The sample that was tempered in 100% $KNO_3$, in the near-surface layer, even showed the formation of two different keatite solid solution structures, both of which had a greater unit cell volume compared to the non-tempered keatite. All 0.7 mm samples that had an increase in set drop resistance additionally showed a DoCL of 140 μm or 135 μm. The CS 30 values were between 150 MPa and 360 MPa.

Samples with a composition according to example 9 were produced in an analogous manner, ceramized as specified in Table 1, example 9, and tempered. They contain nepheline ((Na,K)[$AlSiO_4$]) as the main crystal phase and traces of rutile. An XRD measurement for the nepheline (hexagonal structure) gave the following crystallographic data: a=10.026 (5) Å, c=8.372(5) Å, unit cell volume: V=728.8 (10) Å$^3$. The tempering (100% $KNO_3$, 8 h at 500° C.) gave rise to kalsilite (potassium-substituted end member of the nepheline solid solution series, $KAlSiO_4$): a=5.170(5) Å, c=8.730(5) Å. For direct comparison, it is necessary here on account of the different unit cell size of the two structures to double the a lattice constant (for there to be the same number of formula units in the unit cell). For the kalsilite, this results in a unit cell volume of V=808.3(10) Å$^3$, corresponding to an increase in size of about 10%.

Tempering conditions and tempering parameters thus achieved are listed for different cover glasses in the Table 3 below.

TABLE 3 stress profile parameters obtained via SLP1000 and FSM6000 for different tempered cover glasses comprising glass ceramic

| | Thickness | Ion exchange | | $CS_0$ | K DoL | CS 30 | DoCL |
|---|---|---|---|---|---|---|---|
| Sample | [mm] | Step 1 | Step 2 | [MPa] | [μm] | [MPa] | [μm] |
| 10 | 0.71 | 48 h 490° C. 100% $KNO_3$ | | | 57 | 245 | 57 |
| 11 | 0.71 | 2.5 h 440° C. 100% $NaNO_3$ | | | | 404 | 98 |
| 12 | 0.7 | 9 h 440° C. 100% $NaNO_3$ | | 536 | | 404 | 140 |
| 13 | 0.71 | 4 h 440° C. 100% $KNO_3$ | | 1076 | 12.8 | | 12.8 |
| 14 | 0.71 | 15 h 440° C. 100% $KNO_3$ | | | 27.5 | | 27.5 |
| 15 | 0.71 | 9 h 440° C. 99.5% $NaNO_3$ 0.5% $LiNO_3$ | | | | 313 | 127 |
| 16 | 0.71 | 9 h 440° C. 99% $NaNO_3$ 1% $LiNO_3$ | | | | 232 | 120 |
| 17 | 0.71 | 9 h 440° C. 98.5% $NaNO_3$ 1.5% $LiNO_3$ | | | | 165 | 120 |
| 18 | 0.51 | 2.5 h 440° C. 100% $NaNO_3$ | 1 h 440° C. 100% $KNO_3$ | 1086 | 7.7 | 238 | 98 |
| 19 | 0.51 | 2.5 h 440° C. 100% $NaNO_3$ | 4 h 440° C. 100% $KNO_3$ | 1091 | 14.1 | 78 | 86 |

CT stands here for center tension and is reported in MPa. "K DoL" is the depth of compressive strength resulting from sodium (if applicable) and is reported in μm; $CS_0$ is the level of compressive stress at the surface of the cover glass and is given in MPa; $CS_{30}$ is the compressive stress at a depth of 30 μm, measured from the surface of the cover glass (given in MPa).

Mixed tempering by sodium and lithium can be advantageous in order to improve the fracture profile, i.e. to obtain a less fine crumbly fracture profile.

| | Samples 2 | Samples 3 | Samples 4 |
|---|---|---|---|
| | 20 | 110 | 180 |
| | 50 | 170 | 180 |
| | 30 | 160 | 180 |
| | 20 | 150 | 160 |
| | 50 | 180 | 180 |
| | 60 | 140 | 180 |
| | 30 | 180 | 180 |
| | 50 | 100 | 150 |
| | 60 | 140 | 150 |
| | 70 | 180 | 180 |
| | 40 | 150 | |
| | 20 | 180 | |
| Mean | 42 | 153 | 172 |
| Median | 45 | 155 | 180 |
| Min | 20 | 100 | 150 |
| Max | 70 | 180 | 180 |

Samples 2 to 4 were obtained here by means of the following exchange conditions:

| Sample No. | Thickness [mm] | Exchange 1 | Exchange 2 | $CS_0$ [MPa] | CS 30 [MPa] | DoCL [μm] |
|---|---|---|---|---|---|---|
| 2 | 0.7 | 7.5 h 20/80% K/$NaNO_3$ 410° C. | 3 h 100% $KNO_3$ 395° C. | 840 | 134 | 150 |
| 3 | 0.7 | 9 h; 440 C.; 100% $NaNO_3$ | — | 536 | 404 | 140 |
| 4 | 0.7 | 14 h; 440° C.; 100% $NaNO_3$ | — | 425 | 315 | 135 |

Figure 11:
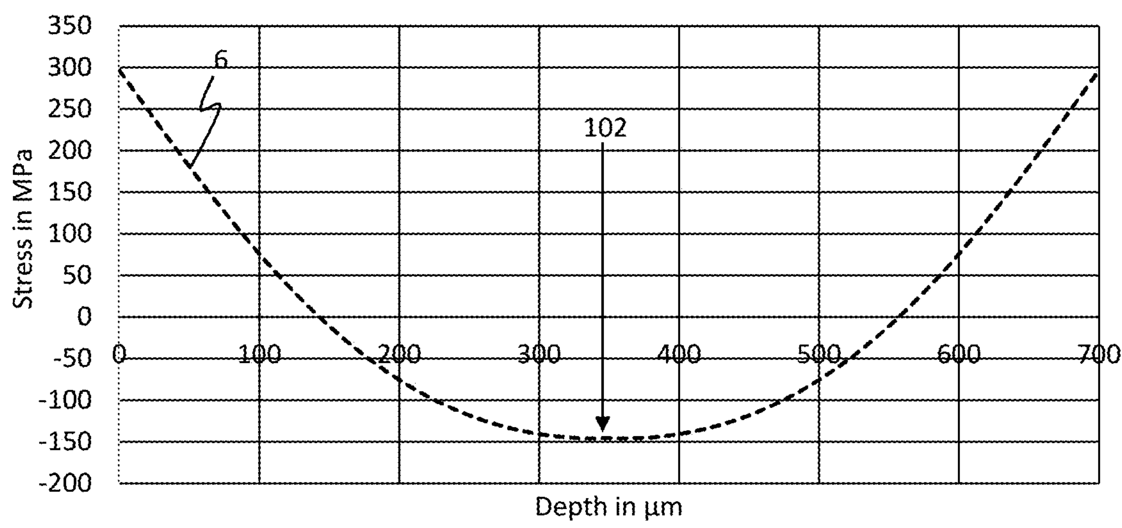

FIG. 11 shows an illustrative stress profile of a cover glass which corresponds to the prior art, the curve progression of which can be approximated in the near-surface region or up to the DoCL by means of a complementary error function or by a parabola. 102 denotes the core, the region in which stress assumes a minimum value.

Stress profiles obtained for a cover glass comprising a silica based glass ceramic according to an embodiment as well as for a cover glass comprising a silica based glass of the chemical composition corresponding to that of the glass ceramic can be depicted. A raw data curve can be obtained by means of mess equipment SLP as well as the smoothed stress profile as a function of depth within the cover glass. The stress in the cover glass according to an embodiment, comprising glass ceramic, is, especially in a near-surface layer of the cover glass, significantly greater than in a cover glass comprising or consisting of glass, corresponding to the more efficient tempering, that is, the more efficient building up of stress due to ion exchange, in the glass ceramic. In particular, in an example, compressive stress in the glass ceramic is larger than in the glass, and this throughout nearly the entire compressive stress zone (due to technical measurement reasons, it cannot be ascertained that the intersection of measurement curves is before or after zero crossing). Accordingly, the resulting central tension (CT) within the glass ceramic is larger than in the glass.

A comparison can be made between the concentration of sodium oxide in a glass and a glass ceramic of identical chemical composition, but a different chemical tempering process, in which sodium has been used as tempering ion. A concentration of sodium oxide is up to a certain depth—in an example, this is at about 140 μm—always above the concentration in the glass. This corresponds approximately to the DoCL of the sample described above. Further, the concentration profile for the glass ceramic shows the same characteristic shape, having at least one inflection point (or, so to say, a "convex" shape).

The advantage of an ion exchange in cover glasses according to embodiments compared to that in cover glasses consisting of or comprising a glass of identical chemical composition can also be seen in samples whose stress profiles or measurement values obtained via SLP are described above. Here, ion exchange was conducted in such a way that the cover glass comprising a silica based glass ceramic according to an embodiment and for the cover glass comprising the corresponding silica based glass both have nearly identical values for CS, that is, compressive stress at the surface of the cover glass, and for DoCL.

Values for these two samples are obtained in a set drop test, as well as results obtained for samples that had not been tempered. Two samples, 7 and 8, relate to values that have been obtained for sample entities comprising cover glasses comprising a silica based glass that had not been tempered respectively a silica based glass ceramic that had not been tempered that had a chemical composition identical to those of the two samples. The respective drop heights for #180 sandpaper for these two samples, 7 and 8, are with values of 36.3 cm and 31.3 cm, respectively, nearly the same. In particular, it is remarkable that the results obtained for a non-tempered glass ceramic are not better than those for the non-tempered glass.

This is different, however, for the values obtained for the corresponding tempered cover glasses in the #60 sandpaper set drop test, wherein a sample 9 refers to the samples of cover glasses comprising tempered silica based glass and a sample 10 shows the values for the samples of cover glasses comprising the corresponding silica based glass ceramic. As has been explained above, the stress values (CS, DoCL) are, taking into account precision of measurements, identical. Cover glasses according to embodiments, that is, comprising a silica based glass ceramic having a stress profile, that has at least one inflection point, have significant advantages. Tempering is achieved much more efficiently in the cover glasses according to embodiments and leads to better results in application-based tests.

Values are listed in the following table:

| Sample np | Glass (not tempered) | Glass ceramic (not tempered) | Tempered glass | Tempered glass ceramic |
|---|---|---|---|---|
| 1 | 90 | 20 | 25 | 90 |
| 2 | 25 | 25 | 20 | 70 |
| 3 | 25 | 25 | 40 | 50 |
| 4 | 25 | 70 | 70 | 25 |
| 5 | 30 | 25 | 40 | 100 |
| 6 | 25 | 30 | 30 | 70 |
| 7 | 30 | 50 | 30 | 90 |
| 8 | 30 | 20 | 60 | 25 |
| 9 | 20 | 20 | 80 | 120 |
| 10 | 25 | 50 | 70 | 40 |
| 11 | 60 | 20 | 50 | 50 |
| 12 | 50 | 20 | 25 | 110 |
| 13 | | | 40 | 100 |
| 14 | | | 30 | 150 |
| 15 | | | 90 | 100 |
| MW | 36.3 | 31.3 | 46.7 | 79.3 |
| Median | 27.5 | 25.0 | 40.0 | 90.0 |

All values for drop height are given in centimeters (cm).

The invention claimed is:

1. A cover glass comprising:

a lithium aluminum silicate glass ceramic that has a main crystal phase of keatite solid solution;

wherein the glass ceramic has $SnO_2$ in an amount 0.05-1.6% by weight, ZnO in an amount 0.44-6% by weight, and MgO in an amount 0.1-8% by weight;

a haze value of 0.01-1%;

a stress profile that has at least one inflection point at a depth of the glass ceramic of more than 10 μm;

a thickness from 0.1 mm to 2 mm; and a chemical tempering structure with a surface compressive stress of at least 250 MPa and at most 1500 MPa.

2. The cover glass as claimed in claim 1, further comprising a transmittance, $T_{vis}$, of more than 80% in a range from 380 nm to 780 nm as determined for thicknesses of 0.4 mm to 0.85 mm.

3. The cover glass as claimed in claim 1, further comprising a transmittance, $T_{vis}$, of more than 85%, in a range from 380 nm to 780 nm as determined for thicknesses of 0.4 mm to 0.85 mm.

4. The cover glass as claimed in claim 1, wherein the glass ceramic comprises the following components in % by weight based on oxide:

| | |
|---|---|
| $SiO_2$ | 55-75 |
| $Al_2O_3$ | 18-27 |
| $Li_2O$ | 2.8-5. |

5. The cover glass as claimed in claim 1, wherein the glass ceramic comprises the following components in % by weight based on oxide:

| | |
|---|---|
| $SiO_2$ | 62-72 |
| $Al_2O_3$ | 18-23 |
| $Li_2O$ | 3-5. |

6. The cover glass as claimed in claim 1, wherein the glass ceramic further comprises the following components in % by weight based on oxide:

| | |
|---|---|
| $SiO_2$ | 55-75 |
| $Al_2O_3$ | 18-27 |
| $Li_2O$ | 2.8-5 |
| $Na_2O$ | 0-4 |
| $K_2O$ | 0-4 |
| MgO | 0.1-8 |
| CaO | 0-4 |
| SrO | 0-4 |
| BaO | 0-4 |
| ZnO | 0.44-6 |
| $TiO_2$ | 0-4 |
| $ZrO_2$ | 0-5 |
| $B_2O_3$ | 0-2 |
| $Fe_2O_3$ | 0.0001-0.1 |
| $SnO_2$ | 0.05-1.6 |

wherein the $TiO_2$ and $ZrO_2$ are in a sum total of greater than 0% and less than 9.5%.

7. The cover glass as claimed in claim 6, wherein the sum total of the $TiO_2$ and $ZrO_2$ is greater than 1.2%.

8. The cover glass as claimed in claim 6, wherein the $SnO_2$, $ZrO_2$ and $TiO_2$ are present according to $0 \leq SnO_2/(ZrO_2+TiO_2) < 0.8$.

9. The cover glass as claimed in claim 6, wherein the $SnO_2$, $ZrO_2$ and $TiO_2$ are present according to $0.01 \leq SnO_2/(ZrO_2+TiO_2) < 0.7$.

10. The cover glass as claimed in claim 6, wherein the glass ceramic comprises the following components in % by weight based on oxide:

| | |
|---|---|
| $SiO_2$ | 62-72 |
| $Al_2O_3$ | 18-27 |
| $Li_2O$ | 3-5 |
| $Na_2O$ | 0-2 |
| $K_2O$ | 0-2 |
| MgO | 0.1-4 |
| CaO | 0-2 |
| SrO | 0-2 |
| BaO | 0-2 |
| ZnO | 0.44-2 |
| $TiO_2$ | 0-3 |
| $ZrO_2$ | 1.2-4 |
| $B_2O_3$ | 0-0.1 |
| $Fe_2O_3$ | 0.0001-0.02 |
| $SnO_2$ | 0.05-1.6. |

11. The cover glass as claimed in claim 1, further comprising a sharp impact resistance determined in a set drop test between a drop height of at least 120 cm and at most 200 cm.

12. The cover glass as claimed in claim 1, wherein the chemical tempering structure comprises a structure selected from a group consisting of: a sodium ion tempering structure, a potassium ion tempering structure, and a sodium and potassium ion tempering structure.

13. The cover glass as claimed in claim 1, wherein the glass ceramic does not have any lithium metasilicate as crystal phase.

14. The cover glass as claimed in claim 1, wherein the glass ceramic is sized and configured for application to an electronic device.

15. The cover glass as claimed in claim 1, further comprising crystallites that are at most 90 nm.

16. The cover glass as claimed in claim 1, wherein the stress profile further comprises a second and a third inflection point.

17. An electronic device comprising: the cover glass as claimed in claim 1.

18. A cover glass comprising:

a lithium aluminum silicate glass ceramic that has a main crystal phase of keatite solid solution;

wherein the glass ceramic has $SnO_2$ in an amount 0.05-1.6% by weight, ZnO in an amount 0.44-6% by weight, and MgO in an amount 0.1-8% by weight;

a haze value of 0.01-1%;

a thickness from 0.1 mm to 2 mm;

a chemical tempering structure with a surface compressive stress of at least 250 MPa and at most 1500 MPa; and a β-value that is given according to the following equation:

$$\beta(x) = \frac{CS(x) + CT}{c(x)_{Ion} - c(\text{Bulk})_{Ion}} \times \frac{1 - v}{E}$$

wherein CT is a central tension, CS(x) is a compressive stress value at depth x, $c(x)_{ion}$ is a concentration of a respective ion, given as oxide, in the depth, and $c(\text{bulk})_{ion}$ is a concentration of the ion in the bulk, v is Poisson's ratio, and E is Young's modulus of the glass ceramic.

19. The cover glass as claimed in claim 18, wherein the chemical tempering structure is sodium ion chemical tempering structure and the β-value is in a range from $3*10^{-4}$/mol to $9*10^{-4}$/mol.

20. A process for producing a cover glass, the process comprising:

producing a lithium aluminum silicate glass by a melting process, wherein the lithium aluminum silicate glass has a composition that comprises $SnO_2$ in an amount of 0.05-1.6% by weight, ZnO in an amount of 0.44-6% by weight, and MgO in an amount of 0.1-8% by weight;

hot shaping the lithium aluminum silicate glass to a thickness from 0.1 mm to 2 mm;

thermal treating the lithium aluminum silicate glass with a nucleation step within a temperature range of 650° C.-850° C. for a duration of 5 min to 60 h and a ceramization step within a temperature range of 700° C.-1100° C. for a duration of 3 min to 120 h to convert the lithium aluminum silicate glass into a lithium aluminum silicate glass ceramic that has a main crystal phase of keatite solid solution; and performing an ion exchange at an exchange bath temperature between 360° C. and 500° C. and for a duration of 2 hours to 50 hours in an exchange bath, wherein the exchange bath has a composition selected from a group consisting of: 100% by weight to 0% by weight of $KNO_3$, 0% by weight to 99.9% by weight of $NaNO_3$, 0% by weight to 5% by weight of $LiNO_3$, and any combinations thereof, wherein the ion exchange yields a chemical tempering structure with a surface compressive stress of at least 250 MPa and at most 1500 MPa, and wherein the cover glass has a haze value of 0.01-1% and a stress profile that has at least one inflection point at a depth of the glass ceramic of more than 10 μm.

21. The process as claimed in claim 20, wherein the ion exchange is a single ion exchange and wherein the exchange bath comprises $NaNO_3$ and up to 0.1% by weight of $LiNO_3$ or comprises $KNO_3$ having a purity of 99.9%, based on weight.

* * * * *